(12) United States Patent
Okada et al.

(10) Patent No.: US 8,010,732 B2
(45) Date of Patent: Aug. 30, 2011

(54) STORAGE SYSTEM PROVIDED WITH A PLURALITY OF STORAGE MODULES

(75) Inventors: Naoki Okada, Odawara (JP); Toshio Asai, Hadano (JP)

(73) Assignee: Hitachi, Ltd., Tokyo (JP)

( * ) Notice: Subject to any disclaimer, the term of this patent is extended or adjusted under 35 U.S.C. 154(b) by 359 days.

(21) Appl. No.: 12/314,770

(22) Filed: Dec. 16, 2008

(65) Prior Publication Data

US 2010/0088455 A1 Apr. 8, 2010

(30) Foreign Application Priority Data

Oct. 7, 2008 (JP) ................................. 2008-261074

(51) Int. Cl.
*G03F 13/00* (2006.01)
*G06F 3/00* (2006.01)

(52) U.S. Cl. ............... 710/316; 710/20; 710/33; 710/38

(58) Field of Classification Search .......... 710/305–317, 710/20–21, 33, 36–38; 361/788; 370/360
See application file for complete search history.

(56) References Cited

U.S. PATENT DOCUMENTS

| | | | | |
|---|---|---|---|---|
| 5,301,303 A | * | 4/1994 | Abraham et al. | 709/223 |
| 5,559,883 A | * | 9/1996 | Williams | 726/13 |
| 7,042,735 B2 | * | 5/2006 | Koga et al. | 361/788 |
| 7,450,578 B2 | * | 11/2008 | Mezeul et al. | 370/389 |
| 7,817,626 B2 | * | 10/2010 | Nakamura et al. | 370/360 |
| 2002/0087751 A1 | * | 7/2002 | Chong, Jr. | 710/33 |
| 2006/0085570 A1 | | 4/2006 | Hosoya et al. | |
| 2006/0184760 A1 | * | 8/2006 | Fujibayashi et al. | 711/170 |
| 2010/0002703 A1 | * | 1/2010 | Kogata et al. | 370/392 |
| 2010/0031074 A1 | * | 2/2010 | Takahashi | 713/324 |

FOREIGN PATENT DOCUMENTS

JP 2005-227807 2/2004

\* cited by examiner

*Primary Examiner* — Christopher B Shin
(74) *Attorney, Agent, or Firm* — Stites & Harbison PLLC; Juan Carlos A. Marquez, Esq.

(57) ABSTRACT

For a storage system provided with a plurality of storage modules including a first storage module and a second storage module, the first storage module is provided with a first switch circuit including a plurality of ports and a first circuit connected to any of the plurality of ports included in the first switch circuit via an internal path, and the second storage module is provided with a second circuit. A direct path that is a path for connecting the first switch circuit and the second circuit is connected to any of the plurality of ports included in the first switch circuit. The first circuit issues a packet addressed to the second circuit. The first switch circuit receives the packet addressed from the first circuit to the second circuit, and outputs the packet from a port connected to the direct path to the second circuit.

19 Claims, 32 Drawing Sheets

FIG.7

| PK TYPE | PKID |
|---------|------|
| SW | 0000 |
| DKA | 0001 |
| CHA | 0010 |
| CM | 0011 |
| MP | 0100 |

FIG.8

| MODULE ID | SLOT ID | PKID |
|-----------|---------|------|

FIG.9

| PKAD | COMMAND TYPE | ACCESS SPEED | DATA |
|------|--------------|--------------|------|

FIG.10

| SW0 PORT NO. | CONNECTING DESTINATION PKAD | | | ROUTING DESTINATION PKAD | | | | DIRECT PATH |
|---|---|---|---|---|---|---|---|---|
| | MODU-LE ID | SLOT ID | PKID | DKA | CHA | CM | MP | |
| 1 | 0001 | 0000 | 0000 | 0001 0000 0001 ~ | 0001 0000 0010 ~ | 0001 0000 0011 ~ | 0001 0000 0100 ~ | |
| 2 | 0001 | 0000 | 0000 | 0001 0000 0001 ~ | 0001 0000 0010 ~ | 0001 0000 0011 ~ | 0001 0000 0100 ~ | |
| 3 | 0001 | 0000 | 0100 | - | - | - | 0001 0000 0100 | O |
| 4 | 0001 | 0000 | 0011 | - | - | 0001 0000 0011 | - | O |
| 5 | 0000 | 0000 | 0100 | - | - | - | 0000 0000 0100 | |
| 6 | 0000 | 0000 | 0011 | - | - | 0000 0000 0011 | - | |
| 7 | 0000 | 0000 | 0001 | - | 0000 0000 0010 | - | - | |
| 8 | 0000 | 0000 | 0010 | 0000 0000 0001 | - | - | - | |
| ~ | ~ | ~ | ~ | ~ | ~ | ~ | ~ | |

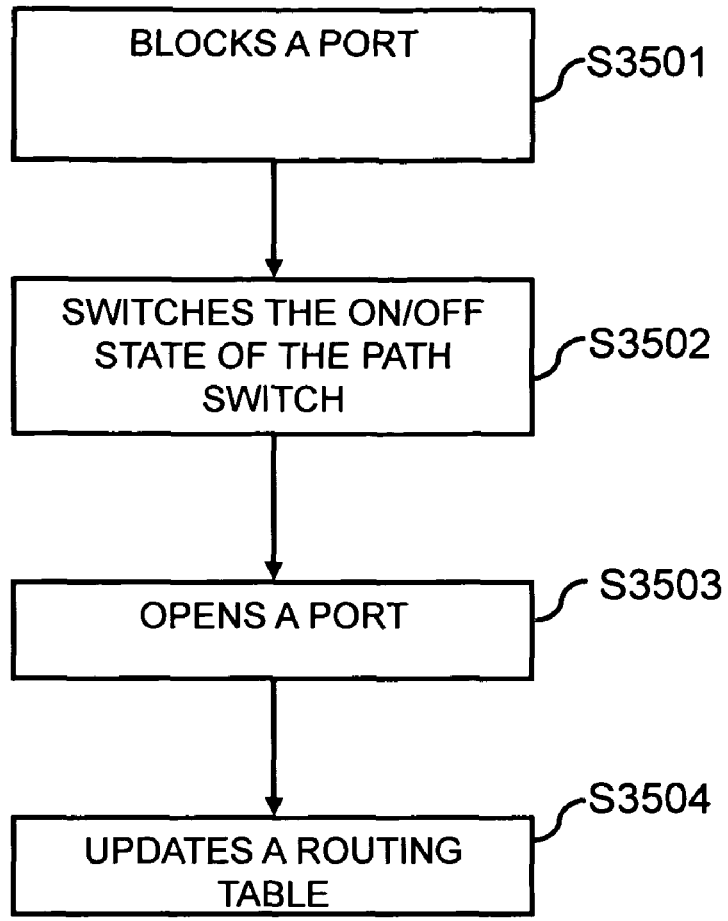

FIG.28

| SW0 PORT NO. | CONNECTING DESTINATION PKAD | | | ROUTING DESTINATION PKAD | | | | DIRECT PATH |
|---|---|---|---|---|---|---|---|---|
| | MODU-LE ID | SLOT ID | PKID | DKA | CHA | CM | MP | |
| 1 | - | - | - | - | - | - | - | |
| 2 | - | - | - | - | - | - | - | |
| 3 | - | - | - | - | - | - | - | |
| 4 | - | - | - | - | - | - | - | |
| 5 | 0000 | 0000 | 0100 | - | - | - | 0000 0000 0100 | |
| 6 | 0000 | 0000 | 0011 | - | - | 0000 0000 0011 | - | |
| 7 | 0000 | 0000 | 0001 | - | 0000 0000 0010 | - | - | |
| 8 | 0000 | 0000 | 0010 | 0000 0000 0001 | - | - | - | |
| ～ | ～ | ～ | ～ | ～ | ～ | ～ | ～ | |

FIG.29

| SW1 PORT NO. | CONNECTION DESTINATION PKAD ||| ROUTING DESTINATION PKAD ||||  DIRECT PATH |
|---|---|---|---|---|---|---|---|---|
| | MODU-LE ID | SLOT ID | PKID | DKA | CHA | CM | MP | |
| 1 | - | - | - | - | - | - | - | |
| 2 | - | - | - | - | - | - | - | |
| | | | | | | | | |
| 4 | - | - | - | - | - | - | - | |
| 5 | - | - | - | - | - | - | - | |
| 6 | - | - | - | - | - | - | - | |
| 7 | 0001 | 0000 | 0001 | - | 0001 0000 0010 | - | - | |
| 8 | 0001 | 0000 | 0010 | 0001 0000 0001 | - | - | - | |
| ~ | ~ | ~ | ~ | ~ | ~ | ~ | ~ | |

FIG.30

| SW0 PORT NO. | CONNECTION DESTINATION PKAD | | | ROUTING DESTINATION PKAD | | | | DIRECT PATH |
|---|---|---|---|---|---|---|---|---|
| | MODULE ID | SLOT ID | PKID | DKA | CHA | CM | MP | |
| 1 | 0001 | 0000 | 0100 | - | - | - | 0001 0000 0100 | ○ |
| 2 | 0001 | 0000 | 0011 | - | - | 0001 0000 0011 | - | ○ |
| 3 | 0001 | 0000 | 0000 | 0001 0000 0001 | 0001 0000 0010 | 0001 0001 0011 | 0001 0001 0100 | |
| 4 | 0001 | 0000 | 0000 | 0001 0000 0001 | 0001 0000 0010 | 0001 0001 0011 | 0001 0001 0100 | |
| 5 | 0000 | 0000 | 0100 | - | - | - | 0000 0000 0100 | |
| 6 | 0000 | 0000 | 0011 | - | - | 0000 0000 0011 | - | |
| 7 | 0000 | 0000 | 0001 | - | 0000 0000 0010 | - | - | |
| 8 | 0000 | 0000 | 0010 | 0000 0000 0001 | - | - | - | |
| ~ | ~ | ~ | ~ | ~ | ~ | ~ | ~ | |

ADDITION (rows 1–4)

FIG.31

| SW1 PORT NO. | CONNECTING DESTINATION PKAD | | | ROUTING DESTINATION PKAD | | | | DIRECT PATH |
|---|---|---|---|---|---|---|---|---|
| | MODULE ID | SLOT ID | PKID | DKA | CHA | CM | MP | |
| 1 | - | - | - | - | - | - | - | |
| 2 | - | - | - | - | - | - | - | |
| 3 | 0000 | 0000 | 0000 | 0000 0000 0001 ~ | 0000 0000 0010 ~ | 0001 0000 0011 ~ | 0001 0000 0100 ~ | |
| 4 | 0000 | 0000 | 0000 | 0000 0000 0001 ~ | 0000 0000 0010 ~ | 0001 0000 0011 ~ | 0001 0000 0100 ~ | |
| 5 | - | - | - | - | - | - | - | |
| 6 | - | - | - | - | 0000 0000 0010 | - | - | |
| 7 | 0001 | 0000 | 0001 | - | - | - | - | |
| 8 | 0001 | 0000 | 0010 | 0001 0000 0001 | - | - | - | |
| ~ | ~ | ~ | ~ | ~ | ~ | ~ | ~ | ~ |

ADDITION (rows 3 and 4)

FIG.33

| SW0 PORT NO. | CONNECTING DESTINATION PKAD | | | DIRECT PATH | | | | |
|---|---|---|---|---|---|---|---|---|
| | MOD-ULE ID | SLOT ID | PKID | | ROUTING DESTINATION PKAD | | | |
| | | | | | DKA | CHA | CM | MP |
| 1 | 0001 | 0000 | 0000 | | 0001 0000 0001 | 0001 0000 0010 | 0001 0000 0011 | 0001 0000 0100 |
| 2 | 0001 | 0000 | 0000 | | 0001 0000 0001 | 0001 0000 0010 | 0001 0000 0011 | 0001 0000 0100 |
| 3 | 0001 | 0000 | 0000 | | 0001 0000 0001 | 0001 0000 0010 | 0001 0000 0011 | 0001 0000 0100 |
| 4 | 0001 | 0000 | 0000 | | 0001 0000 0001 | 0001 0000 0010 | 0001 0000 0011 | 0001 0000 0100 |
| 5 | 0000 | 0000 | 0100 | | - | - | - | 0000 0000 0100 |
| 6 | 0000 | 0000 | 0011 | | - | - | 0000 0000 0011 | - |
| 7 | 0000 | 0000 | 0001 | | 0000 0000 0001 | - | - | - |
| 8 | 0000 | 0000 | 0010 | | - | 0000 0000 0010 | - | - |
| ~ | ~ | ~ | ~ | | ~ | ~ | ~ | ~ |

UP DATE (rows 1–4)

FIG.34

| SW1 PORT NO. | CONNECTING DESTINATION PKAD ||| ROUTING DESTINATION PKAD |||| DIRECT PATH |
|---|---|---|---|---|---|---|---|---|
| | MODULE ID | SLOT ID | PK ID | DKA | CHA | CM | MP | |
| 1 | 0001 | 0000 | 0000 | 0000 0000 0001 | 0000 0000 0010 | 0000 0000 0011 | 0000 0000 0100 | |
| 2 | 0001 | 0000 | 0000 | 0000 0000 0001 | 0000 0000 0010 | 0000 0000 0011 | 0000 0000 0100 | |
| 3 | 0000 | 0000 | 0000 | 0000 0000 0001 | 0000 0000 0010 | 0000 0000 0011 | 0000 0000 0100 | |
| 4 | 0000 | 0000 | 0000 | 0000 0000 0001 | 0000 0000 0010 | 0000 0000 0011 | 0000 0000 0100 | |
| 5 | 0001 | 0000 | 0100 | - | 0000 0000 0010 | 0001 0000 0011 | 0001 0000 0100 | |
| 6 | 0001 | 0000 | 0001 | - | - | 0001 0000 0011 | - | |
| 7 | 0001 | 0000 | 0010 | - | 0001 0000 0010 | - | - | |
| 8 | 0001 | 0000 | 0001 | 0001 0000 0001 | - | - | - | |
| ~ | ~ | ~ | ~ | ~ | ~ | ~ | ~ | ~ |

ADDITION (ports 1-2), ADDITION (port 5)

FIG.36

| SW0 PORT NO. | CONNECTING DESTINATION PKAD | | | ROUTING DESTINATION PKAD | | | | DIRECT PATH |
|---|---|---|---|---|---|---|---|---|
| | MODULE ID | SLOT ID | PKID | DKA | CHA | CM | MP | |
| 1 | 0001 | 0000 | 0100 | - | - | - | 0001 0000 0100 | O |
| 2 | 0001 | 0000 | 0011 | - | - | 0001 0000 0011 | - | O |
| 3 | 0001 | 0000 | 0000 | 0001 0000 0001 | 0001 0000 0010 | 0001 0000 0011 | 0001 0000 0100 | |
| 4 | 0001 | 0000 | 0100 | 0001 0000 0001 | 0001 0000 0010 | 0001 0001 0011 | 0001 0000 0100 | |
| 5 | 0000 | 0000 | 0100 | - | - | - | 0000 0000 0100 | |
| 6 | 0000 | 0000 | 0001 | - | 0000 0000 0010 | 0000 0000 0011 | - | |
| 7 | 0000 | 0000 | 0001 | 0000 0000 0001 | - | - | - | |
| 8 | 0000 | 0000 | 0010 | - | - | - | - | |
| ~ | ~ | ~ | ~ | ~ | ~ | ~ | ~ | ~ |

UP DATE

FIG.37

| SW1 PORT NO. | CONNECTING DESTINATION PKAD | | | ROUTING DESTINATION PKAD | | | | DIRECT PATH |
|---|---|---|---|---|---|---|---|---|
| | MODU-LE ID | SLOT ID | PKID | DKA | CHA | CM | MP | |
| 1 | - | - | - | - | - | - | - | |
| 2 | - | - | - | - | - | - | - | |
| 3 | 0000 | 0000 | 0000 | 0000 0000 0001 | 0000 0000 0010 | 0000 0000 0011 | 0000 0000 0100 | |
| 4 | 0000 | 0000 | 0000 | 0000 0000 0001 | 0000 0000 0010 | 0000 0000 0011 | 0000 0000 0100 | |
| 5 | - | - | - | - | - | - | - | |
| 6 | - | - | - | - | - | - | - | |
| 7 | 0001 | 0000 | 0001 | - | 0001 0000 0010 | - | - | |
| 8 | 0001 | 0000 | 0010 | 0001 0000 0001 | | - | - | |
| ~ | ~ | ~ | ~ | ~ | ~ | ~ | ~ | |

UP DATE (rows 1-2)     UP DATE (rows 5-6)

STORAGE SYSTEM PROVIDED WITH A PLURALITY OF STORAGE MODULES

CROSS-REFERENCE TO PRIOR APPLICATIONS

This application relates to and claims the benefit of priority from Japanese Patent Application number 2008-261074, filed on Oct. 7, 2008, the entire disclosure of which is incorporated herein by reference.

BACKGROUND

The present invention generally relates to a storage system provided with a plurality of storage modules.

A system disclosed in Japanese Patent Application Laid-Open Publication No. 2005-227807 is known for instance as a storage system provided with a plurality of storage modules. For the system, a switch section included in a storage module and a switch section included in another storage module are connected to each other, thereby enabling an inter-module communication.

SUMMARY

For instance, in the case in which a circuit in a first storage module (hereafter referred to as a first circuit, such as a microprocessor) accesses a circuit in a second storage module (hereafter referred to as a second circuit, such as a cache memory), a packet to be transferred from the first circuit to the second circuit is routed through the both of a switch in a first storage module (hereafter referred to as a first SW) and a switch in a second storage module (hereafter referred to as a second SW). Consequently, it may be hard to carry out a high speed access between storage modules.

An object of the present invention is to carry out a high speed access between storage modules.

For a storage system provided with a plurality of storage modules including a first storage module and a second storage module, the first storage module is provided with a first switch circuit including a plurality of ports and a first circuit connected to any of the plurality of ports included in the first switch circuit via an internal path, and the second storage module is provided with a second circuit. A direct path that is a path for connecting the first switch circuit and the second circuit is connected to any of the plurality of ports included in the first switch circuit. The first circuit issues a packet addressed to the second circuit. The first switch circuit receives, from the first circuit, the packet addressed to the second circuit, and outputs the packet from a port connected to the direct path to the second circuit.

BRIEF DESCRIPTION OF THE DRAWINGS

FIG. 7 shows an example of a relationship between a PK type and a PKID.

FIG. 8 shows an example of a format of a PKAD.

FIG. 9 shows an example of a format of a packet.

FIG. 10 shows a routing table included in a SW0.

FIG. 24 shows a flow of a path switch processing.

FIG. 25 shows a configuration example of a port control table.

FIG. 28 shows a routing table 0 before an addition of a module 1.

FIG. 29 shows a routing table 1 before an addition of a module 1.

FIG. 30 shows a routing table 0 after an addition of a module 1.

FIG. 31 shows a routing table 1 after an addition of a module 1.

FIG. 33 shows a routing table 0 after a detection of an operational status of a first kind.

FIG. 34 shows a routing table 1 after a detection of an operational status of a first kind.

FIG. 36 shows a routing table 0 after a detection of an operational status of a second kind.

FIG. 37 shows a routing table 1 after a detection of an operational status of a second kind.

DETAILED DESCRIPTION

Some embodiments for the present invention will be described below in detail with reference to the drawings.

Embodiment 1

Figure 1:
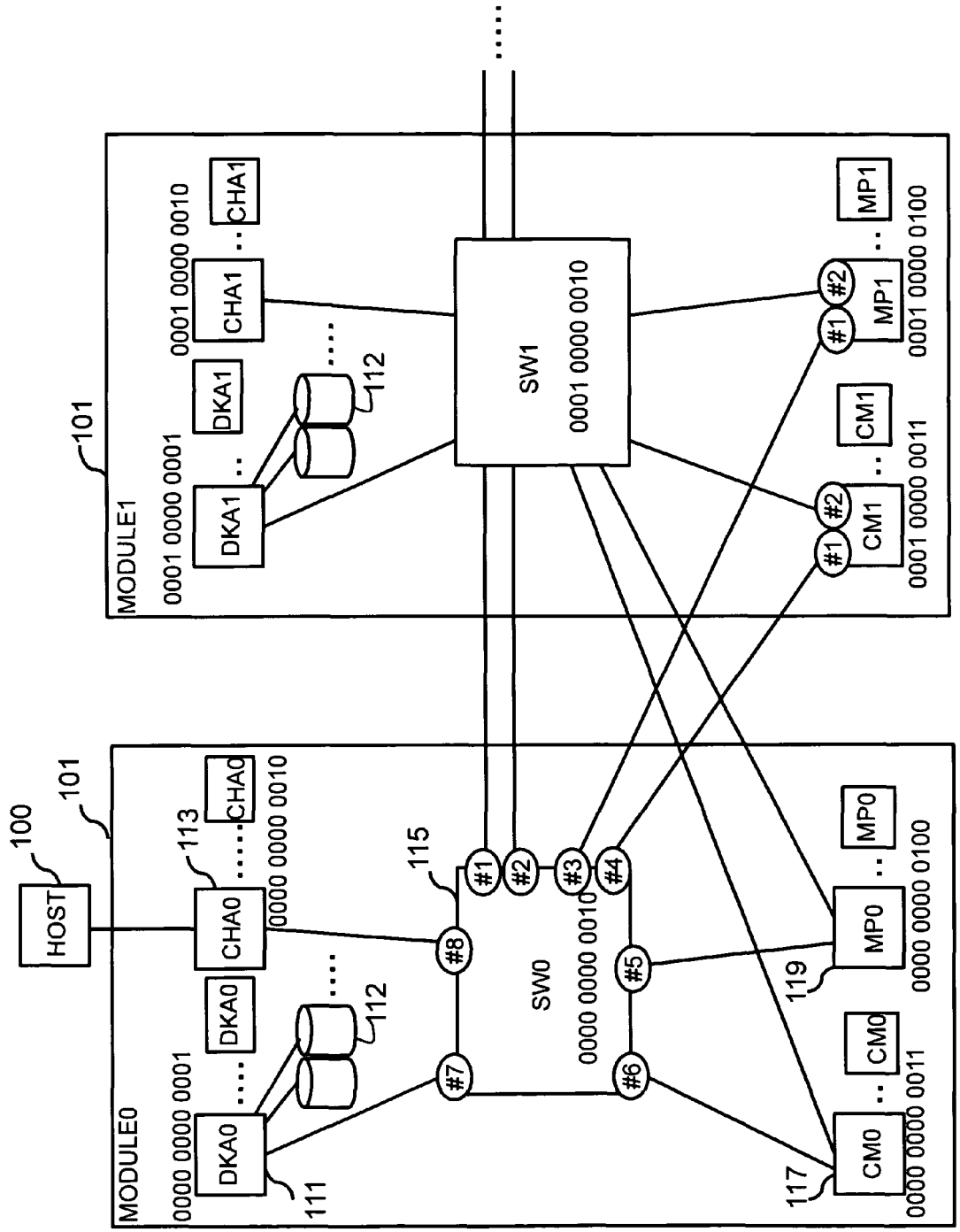
FIG. 1 shows a configuration example of a storage system in accordance with a first embodiment of the present invention.

FIG. 1 shows a configuration example of a storage system in accordance with a first embodiment of the present invention.

A storage system is provided with a plurality of storage modules (hereafter referred to as modules) 101. A module in accordance with an embodiment of the present invention is a unit of an addition and a reduction, and can function as a storage system even singly.

The module 101 is composed of a plurality of packages (hereafter referred to as PK) and a plurality of HDDs (Hard Disk Drives) 112. As substitute for the HDD, physical storage devices of other kinds such as a flash memory can also be adopted.

The PK is a unit of an addition and a reduction to the module 101. The PK is a circuit board for instance. A CHA (Channel Adaptor) 113, a DKA (Disk Adaptor) 111, a SW (Switch) 115, a CM (Cache Memory) 117, and an MP (Micro Processor) 119 can be mentioned as a PK for instance. The CHA 113 is a circuit that functions as an interface to a host computer 100 (or an external device of other kind). The DKA 111 is a circuit that functions as an interface to the HDD 112. The SW 115 controls a data transfer from a PK to another PK. The CM 117 is a circuit provided with a memory that temporarily stores data transmitted or received between the host 100 and the HDD 112. The MP 119 controls an operation of other PK. One PK or a plurality of PKs is included in the module 101.

Figure 2:
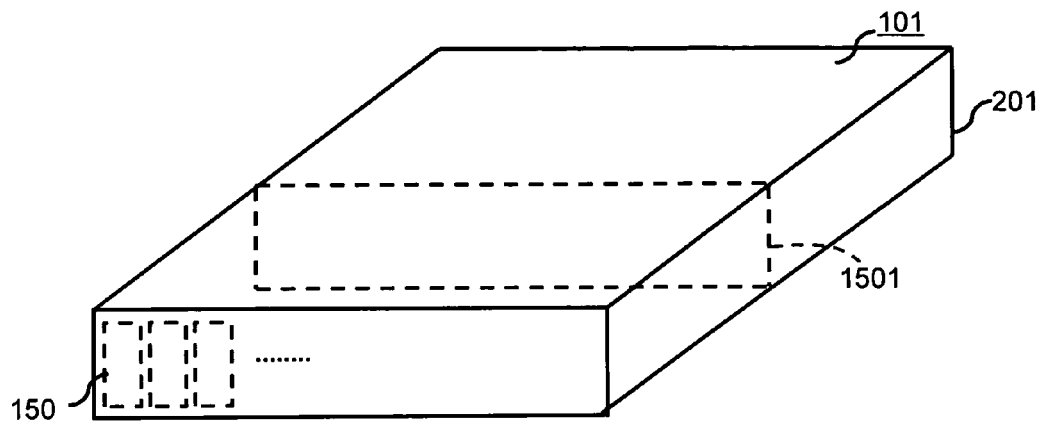
FIG. 2 is a schematic view showing an example of an appearance of a module.

The module 101 has a housing 201 as shown in FIG. 2 for instance. The housing 201 includes the PK of various kinds and the HDD 112 described above. The PK is inserted into any one of a plurality of slots 150, and connected to a connector (not shown) mounted on a back board (circuit board) 1701 in the housing 201.

In the following, the module will be described as a module n, and n is an integer of serial numbers 0, 1, . . . . In addition, each PK in the module is numerically numbered similarly to the serial number of the module. By this, it can be clear which PK is included in which module. The number of modules is two, and the modules are a module 0 and a module 1 in the following.

As shown in FIG. 1, a connection between the modules 0 and 1 is implemented by a connection between SW0 and SW1, a connection between SW0 and PKs other than SW1 in the module 1, and a connection between SW1 and PKs other than SW0 in the module 0. More specifically, SW0 is connected to CM1 and MP1 in addition to SW1, and SW1 is connected to CM0 and MP0 in addition to SW0. Consequently, as a path connecting SW0 and CM0, and a path connecting SW0 and MP0 (a path connecting SW1 and CM1, and a path connecting SW1 and MP1), there are two kinds of paths that are a path routed through SW1 (SW0) and a path not routed through SW1 (SW0). In the following, a path routed through SW1 (SW0) is referred to as a SW connection path, and a path not routed through SW1 (SW0) is referred to as a direct path in some cases.

Figure 3:
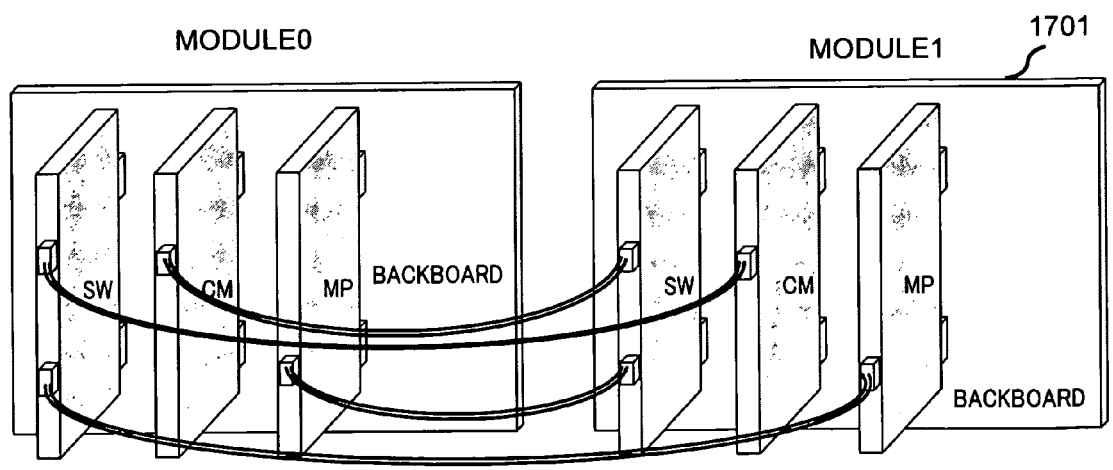
FIG. 3 shows a first example of a connection between modules.
Figure 4:
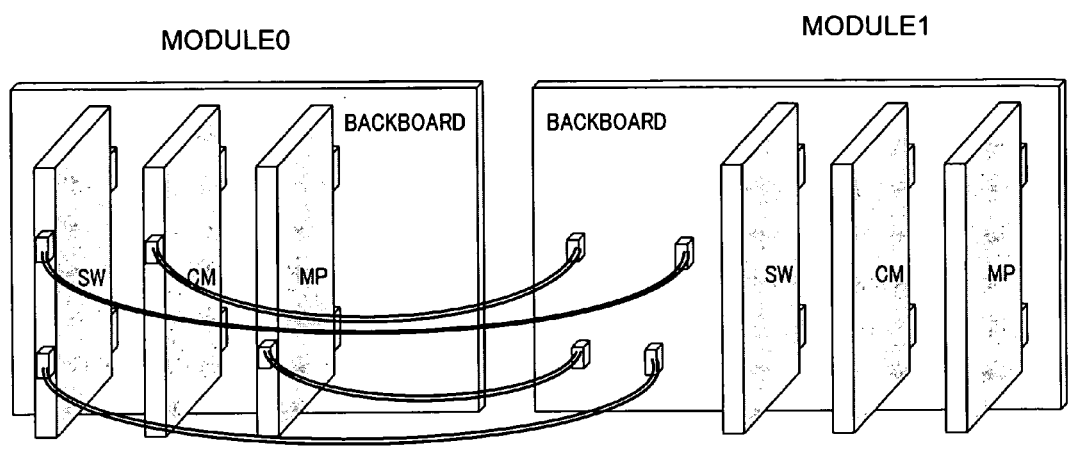
FIG. 4 shows a second example of a connection between modules.
Figure 5:
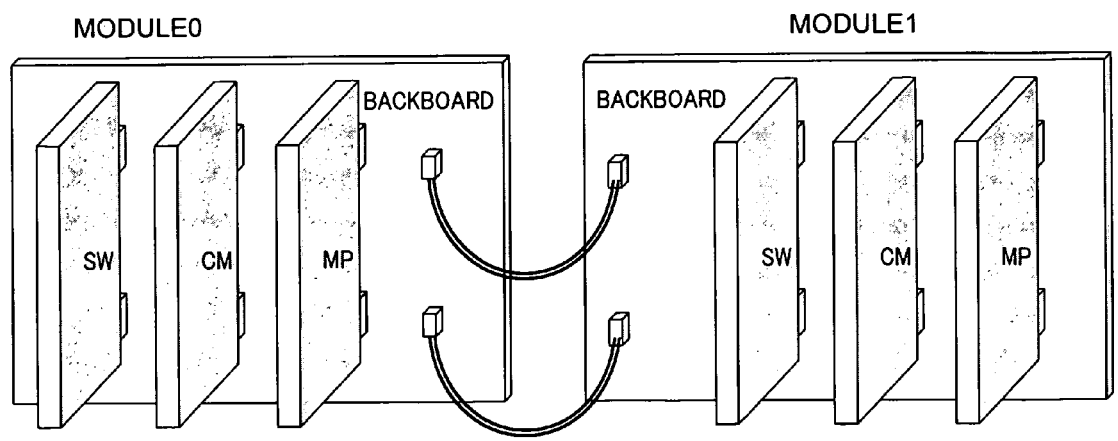
FIG. 5 shows a third example of a connection between modules.

A connection between SW0 and CM1, a connection between SW0 and MP1, a connection between SW1 and CM0, and a connection between SW1 and MP0 are implemented by a variety of methods such as any one of methods shown in FIGS. 3 to 5. According to a method shown in FIG. 3, a cable is connected to a connector mounted on one PK (such as SW0) and a connector mounted on the other PK (such as CM1 and MP1). According to a method shown in FIG. 4, one end of a cable is connected to a connector mounted on SW0, MP0, or CM0, and the other end of the cable is connected to a connector mounted on a back board 1. According to a method shown in FIG. 5, a cable is connected to a connector mounted on a back board 0 and a connector mounted on a back board 1. For the methods shown in FIGS. 4 and 5, a SW connection path and a direct path are implemented according to a printed wiring of the back board 1 (and the back board 0).

See FIG. 1 again. An example of the module 0 will be described below as the representative of the modules 0 and 1.

SW0 includes a plurality of ports (hereafter referred to as SW ports), such as eight SW ports #1 to #8 (for SW1, an illustration of ports is omitted). Among the eight SW ports #1 to #8, SW ports #1 and #2 are SW ports that are connected to the SW connection path, SW ports #3 and #4 are SW ports that are connected to the direct path, and other SW ports #5, #6, #7, and #8 are SW ports that are connected to the internal path for connecting SW0 and other PK0. More specifically, the eight SW ports included in SW0 are connected to SW1, CM1, MP1, and PKs in the module 0. Any of the eight SW ports can be connected to any of SW1, CM1, MP1, and PK0. More specifically, for instance, the SW ports #1 and #2 are not dedicated SW ports that are connected to the SW connection path, and the SW connection path can be connected to other SW ports. Similarly, the SW ports #3 and #4 are not dedicated SW ports that are connected to the direct path, and the direct path can be connected to other SW ports.

Figure 6:
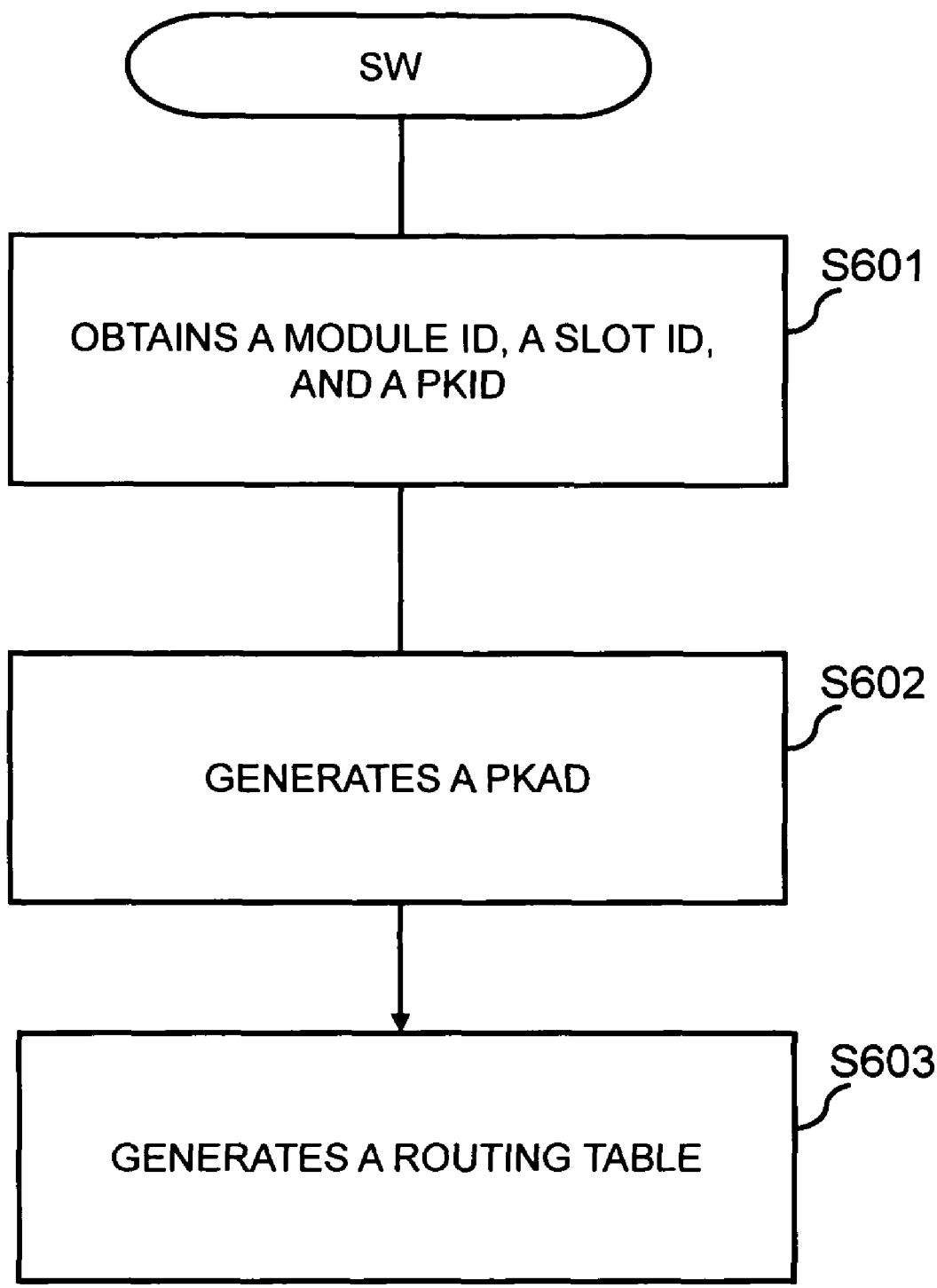
FIG. 6 shows a flow of a creation processing for a routing table of a SW.

SW0 executes the processing shown in FIG. 6 as follows:
S601: obtains a module ID, a slot ID, and a PKID via the SW ports #1 to #8;
S602: generates a PKAD (PK address);
S603: creates a routing table.
Each of the processing will be described in the following.
<S601: Obtains a Module ID, a Slot ID, and a PKID>

The module ID is an identifier of the module 101.

The slot ID is an identifier of a slot 150 into which a PK is inserted (see FIG. 2). The slot ID can be a non-overlapping code regardless of a type of a PK, and can be a non-overlapping code only for a type of a PK. For an example shown in FIGS. 1 and 10, the same identifier "0000" is allocated to a slot for a DKA and a slot for a CHA.

The PKID is an identifier of a type of a PK. (an example of a relationship between a PK type and a PKID is shown in FIG. 7). Consequently, providing a PK type of each PK is equivalent to each other, a PKID of each PK is also equivalent to each other.

In the case in which each PK0 (such as CHA0 and DKA0) is connected to the back board 0, the PK0 obtains a module ID and a slot ID from the back board 0. More specifically, the PK0 identifies the module ID and the slot ID by a resistance value that is detected when the PK0 is connected via the slot 150 to a connector mounted on the back board 0. The PKID is set to the PK0 in advance. The module ID and the slot ID that have been identified and the PKID set in advance are stored in a storage resource (such as a memory) included in the PK0.

SW0 obtains the module ID, the slot ID, and the PKID from each PK (SW1, MP1, CM1, and PK0 other than SW0) via the SW ports #1 to #8. As the module ID, the slot ID, and the PKID that are obtained from the SW ports #1 and #2, the module ID, the slot ID, and the PKID of each PK1 connected to SW1 can be mentioned in addition to the module ID, the slot ID, and the PKID of SW1. A group of the module ID, the slot ID, and the PKID that have been obtained and of an identifier of a SW port which the IDs are routed through is stored in a storage resource (such as a memory) included in the SW0.
<S602: Generates a PKAD>

The SW0 generates a PKAD for each of the SW ports #1 to #8. As shown in FIG. 8, the PKAD is data composed of the module ID, the slot ID, and the PKID.

<S603: Creates a Routing Table>

The SW0 creates a routing table based on the PKAD for each of the SW ports #1 to #8.

FIG. 10 shows a routing table included in the SW0.

The routing table is a table that indicates which destination is a destination of a packet received by SW0 and which SW port is a SW port that a packet is transferred from. More specifically, a SW port number, a connecting destination PKAD, a routing destination PKAD, and a direct path flag for every SW port are recorded in the routing table for instance. Each information element will be described below using a SW port as an example (hereafter referred to as a target SW port in the description of FIG. 10).

The SW port number is an identification number of the target SW port.

The connecting destination PKAD is a PKAD of a PK connected to the target SW port. More specifically, the connecting destination PKAD is a PKAD that is generated based on the module ID, the slot ID, and the PKID that are obtained via the target SW port.

The routing destination PKAD is a PKAD of a PK that can be transferred from the target SW port. The routing destination PKAD is recorded for each PK of DKA, CHA, CM, and MP. In the case in which a PK connected to the target SW port is a PK other than SW1 (in the case in which a PKID of a connecting destination PKAD corresponding to the target SW port is corresponded to a PK type other than a PK type "SW"), a routing destination PKAD, that is, a PKAD equivalent to the connecting destination PKAD is set to a column corresponding to a PK type indicated by a PKID in the PKAD for the target SW port. On the other hand, in the case in which a PK connected to the target SW port is a SW1 (in the case in which a PKID of a connecting destination PKAD corresponding to the target SW port is corresponded to a PK type "SW"), a plurality of routing destination PKADs are set for the target SW port (see a record for the SW ports #1 and #2 in FIG. 10). This is because, in the case of SW1 of a connecting destination PK, the module ID, the slot ID, and the PKID of each PK1 (DKA1, CHA1, CM1, and MP1) connected to SW1 are obtained from SW1 in addition to the module ID, the slot ID, and the PKID of SW1.

The direct path flag is a flag that indicates whether a path connected to the target SW port is a direct path or not. A direct path is connected to a SW port in which a circle mark is entered in the column of the direct path in FIG. 10 (that is, a direct path flag is on (a flag value is "1")). In the case in which the number of the routing destination PKAD corresponding to the target SW port is just one, and the routing destination PKAD is equivalent to a connecting destination PKAD corresponding to the target SW port, SW0 judges that a path connected to the target SW port is a direct path, and makes a direct path flag corresponding to the target SW port on. More specifically, the number of the routing destination PKAD is just one and the routing destination PKAD is equivalent to a connecting destination PKAD for the SW ports #3 and #4 in FIG. 10. Consequently, SW0 judges that the SW ports #3 and #4 are connected to the direct path.

SW0 receives a packet via any one of SW ports, and refers to the routing table. SW0 then specifies the SW port corresponding to the destination specified in the received packet, and transfers the packet from the SW port.

FIG. 9 shows an example of a format of a packet.

A packet includes PKAD, the information of a command type, an access speed bit, and transfer targeted data. The PKAD is a PKAD of a destination PK. The information of a command type is information that indicates a type of a command represented by the packet (for instance, a write or a read). The access speed bit is a bit that indicates whether a transfer speed of a packet is high ("1") or low ("0").

In the case in which SW0 receives a packet, SW0 specifies the SW port corresponding to the routing destination PKAD equivalent to a PKAD in the packet, and transfers the packet from the specified SW port.

In the case in which a plurality of specified SW ports are specified (for instance, in the case in which SW0 receives a packet including PKAD of CM1, whereby the SW ports #1, #2, and #4 are specified), one of the SW ports (such as the SW port #4) is a SW port that is connected to the direct path, and other SW ports (such as the SW ports #1 and #2) are SW ports that are connected to the SW connection path. In this case, in the case in which the access speed bit in the received packet indicates a high speed, SW0 transfers the packet from the SW port that is connected to the direct path (such as the SW port #4). On the other hand, in the case in which the access speed bit in the received packet indicates a low speed, SW0 transfers the packet from any one of at least one SW port that is connected to the SW connection path (such as the SW ports #1 and #2). A SW port that is selected from at least one SW port is a SW port with a low load.

The information of the routing table that has been created by SW0 is transmitted from SW0 to each MP (MP0 and MP1) connected to SW0, and is used by each MP. Each MP includes a plurality of ports (hereafter referred to as MP ports). Based on the information, MP can know which MP port of its own is an MP port that is connected to the direct path. Consequently, in the case in which MP transmits a packet, MP can judge based on the information of the routing table whether MP transmits a packet to SW in other module (different from a module that includes the MP) via the direct path or transmits a packet to SW in the module of its own (a module that includes the MP).

Figure 11:
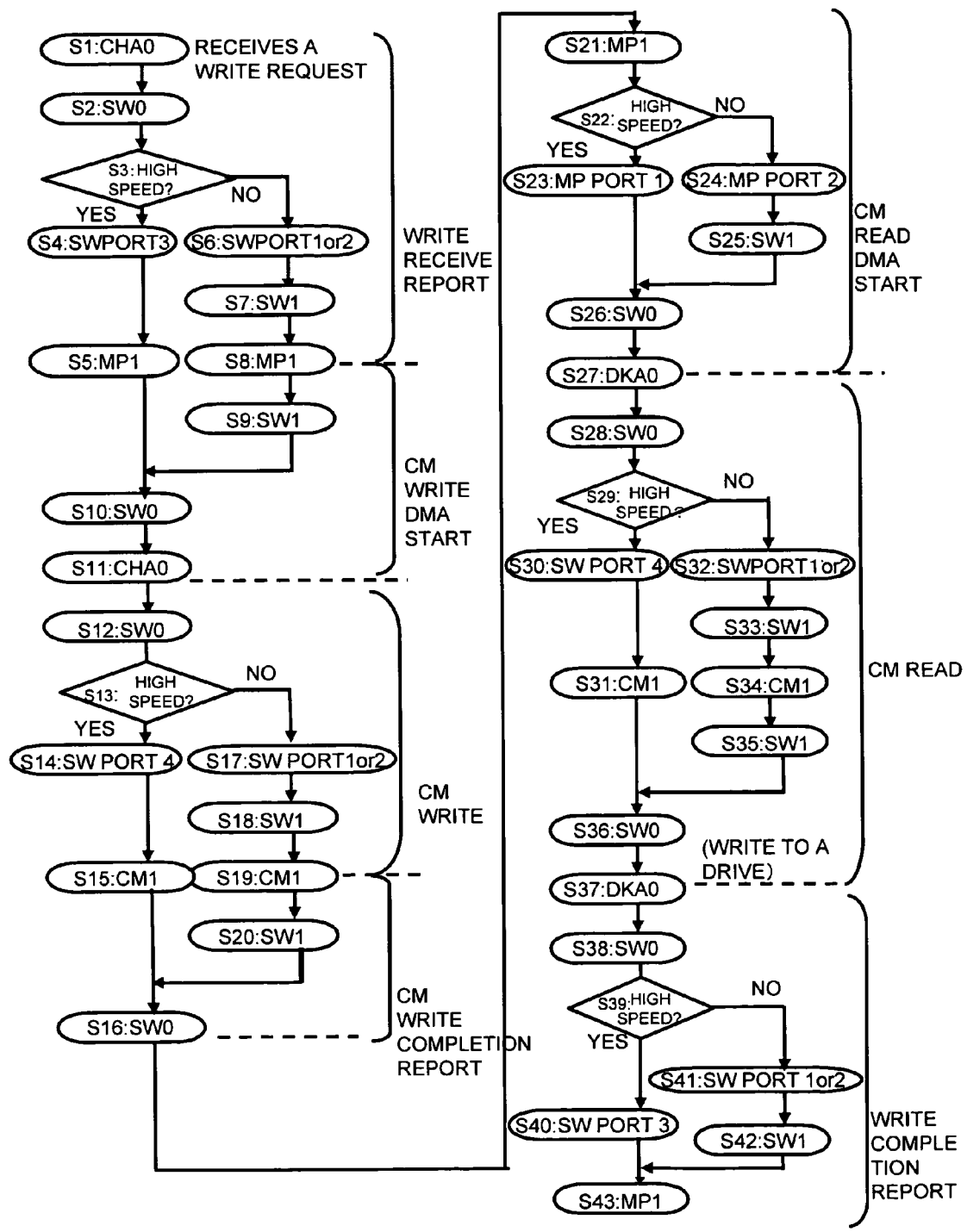
FIG. 11 shows a flow of a processing that is carried out in the case in which a CHA0 receives a write command from a host.

FIG. 11 shows a flow of a processing that is carried out in the case in which a CHA0 receives a write command from a host.

In the case in which CHA0 receives a write command, a write receive report processing is carried out. More specifically, CHA0 generates a packet of which the destination is MP1 (hereafter referred to as a packet W1) based on the write command, and transmits the packet W1 to SW0 (S1). The information of a packet type for the packet W1 is information that indicates a write. SW0 receives the packet W1 from CHA0 (S2), and judges whether the access is a high speed access or not (S3) since the destination of the packet W1 is MP1 that is connected to the direct path. In the case in which SW0 judges that the access is a high speed access (S3: YES), SW0 transfers the packet W1 from the SW port #3 to MP1 through the direct path (S4). On the other hand, in the case in which SW0 judges that the access is a low speed access (S3: NO), SW0 transfers the packet W1 from the SW port #1 or #2 to MP1 through the SW connection path (S6 and S7).

Subsequently, a CM write DMA (Direct Memory Access) start processing is carried out. More specifically, MP1 responds to the packet W1 transferred from CHA0, and transmits a packet of which the destination is CHA0 via SW0 (hereafter referred to as a packet W2) (S5, S8, S9, and S10). The information of a command type for the packet W2 is information that indicates a write for instance.

Subsequently, a CM write processing is carried out. More specifically, CHA0 responds to the packet W2 transferred from MP1, and transmits a packet of which the destination is CM1 (hereafter referred to as a packet W3) (S1). The packet W3 includes the information that indicates a write as the information of a command type and the write targeted data that complies with a write command from the host. SW0 receives the packet W3 from CHA0 (S12), and judges whether the access is a high speed access or not (S13) since the destination of the packet W3 is CM1 that is connected to the direct path. In the case in which SW0 judges that the access is a high speed access (S13: YES), SW0 transfers the packet W3 from the SW port #4 to CM1 through the direct path (S14). On the other hand, in the case in which SW0 judges that the access is a low speed access (S13: NO), SW0 transfers the packet W3 from the SW port #1 or #2 to CM1 through the SW connection path (S17 and S18). CM1 responds to the packet W3 transferred from CHA0, and writes data in the packet W3 to CM1 (S15 and S19).

Subsequently, a CM write completion report is carried out. More specifically, CM1 transmits a packet of which the destination is MP1 (hereafter referred to as a packet W4) (S16 and S20). The packet W4 is a packet as a report of a write completion, and is sent to MP1 through a route equivalent to that of the packet W3 for instance.

Subsequently, a CM read DMA start processing is carried out. More specifically, MP1 responds to the packet W4, and generates a packet of which the destination is DKA0 (hereafter referred to as a packet W5) (S21). In the case in which the access is a high speed access (S22: YES), the access speed bit in the packet W5 is made a bit that indicates a high speed, and MP1 transfers the packet W5 through the MP port #1 (MP port connected to the direct path) (S23). On the other hand, in the case in which the access is a low speed access (S22: NO), the access speed bit in the packet W5 is made a bit that indicates a low speed, and MP1 transfers the packet W5 from the MP port #2 (MP port connected to the SW1) (S24). SW0 receives the packet W5, and transmits the packet W5 to DKA0 that is a destination of the packet W5 (S25 and S26).

Subsequently, a CM read proces sing is carried out. More specifically, DKA0 responds to the packet W5, generates a packet of which the destination is CM1 (hereafter referred to as a packet W6), and transmits the packet W6 to SW0 (S27). The information of a packet type for the packet W6 is information that indicates a read. SW0 receives the packet W6 from CHA0 (S28), and judges whether the access is a high speed access or not (S29) since the destination of the packet W6 is CM1 that is connected to the direct path. In the case in which SW0 judges that the access is a high speed access (S29: YES), SW0 transfers the packet W6 from the SW port #4 to CM1 through the direct path (S30). On the other hand, in the case in which SW0 judges that the access is a low speed access (S29: NO), SW0 transfers the packet W6 from the SW port #1 or #2 to CM1 through the SW connection path (S32 and S33). CM1 responds to the packet W6 transferred from DKA0, reads data from CM1 (S31 and S34), and transmits a packet of which the destination is DKA0 (hereafter referred to as a packet W7) (S35 and S36). The packet W7 includes data that has been read from CM1.

Finally, a write completion report processing is carried out. More specifically, DKA0 responds to the packet W7, writes data in the packet W7 to HDD 112 (S37), generates a packet of which the destination is MP1 (hereafter referred to as a packet W8), and transmits the packet W8 to SW0 (S38). SW0 receives the packet W8 from DKA0, and judges whether the access is a high speed access or not (S39) since the destination of the packet W8 is MP1 that is connected to the direct path. In the case in which SW0 judges that the access is a high speed access (S39: YES), SW0 transfers the packet W8 from the SW port #3 to MP1 through the direct path (S40). On the other hand, in the case in which SW0 judges that the access is a low speed access (S39: NO), SW0 transfers the packet W8 from the SW port #1 or #2 to MP1 through the SW connection path (S41 and S42). MP1 receives the packet W8 (S43).

The above described a flow of a processing that is carried out in the case in which a CHA0 receives a write command from a host. In this flow, in the case in which it is not necessary to carry out a write operation to HDD112 at a high speed after the CM write processing is carried out, DKA0 can read data from CM1 through the SW connection path. More specifically, a high speed access is made valid for a packet of sequence numbers 1 to m (1<m<k) among the packets of the sequence numbers 1 to k (that is, data may be read from CM1 using a direct path), and a high speed access is made invalid for a packet of sequence numbers m+1 to k. As a result, HDD112 can be accessed without taking sole possession of a direct path.

Figure 12:
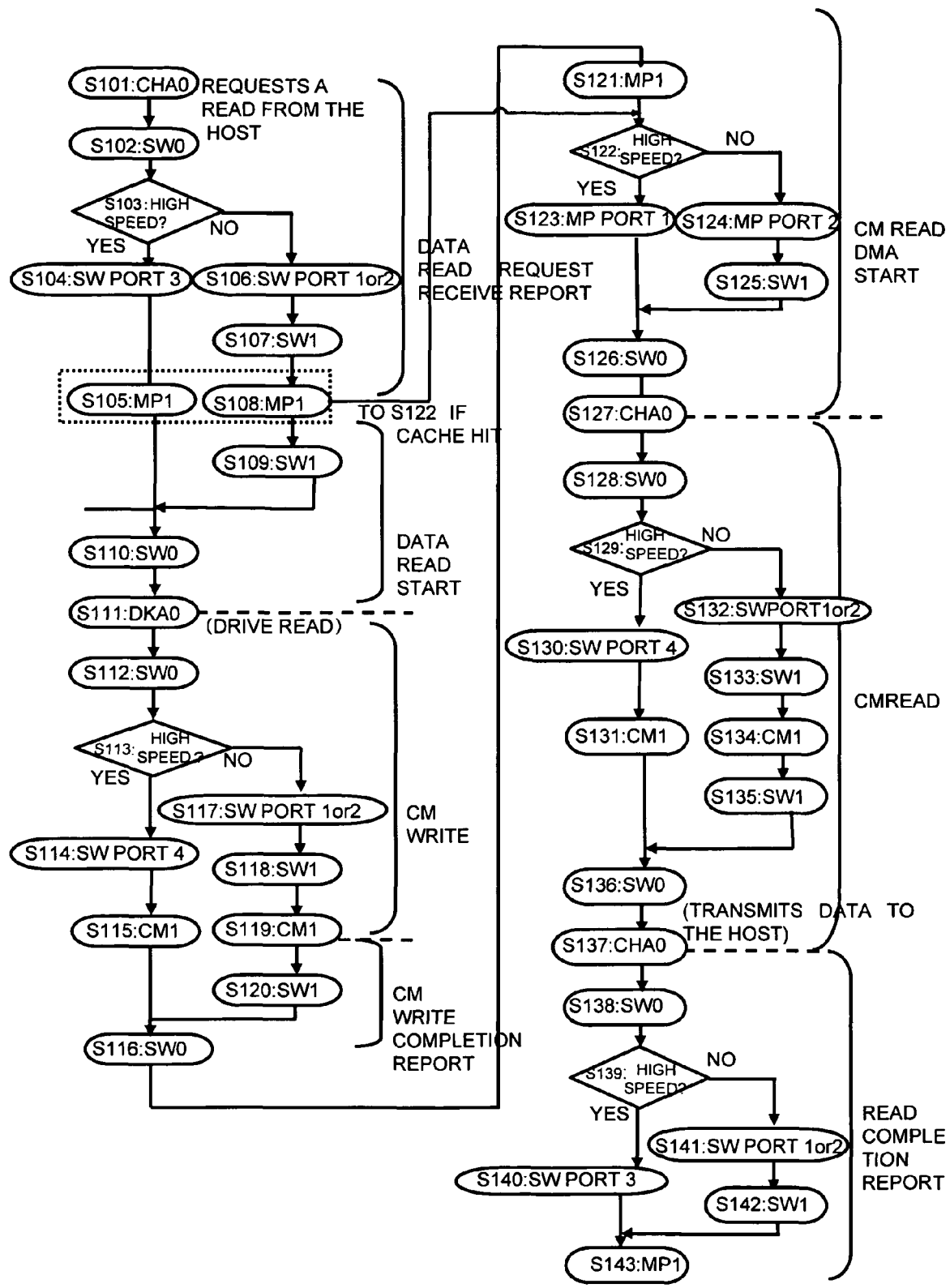
FIG. 12 shows a flow of a processing that is carried out in the case in which a CHA0 receives a read command from a host.

FIG. 12 shows a flow of a processing that is carried out in the case in which a CHA0 receives a read command from a host.

In the case in which CHA0 receives a read command, a read receive report processing is carried out. More specifically, CHA0 generates a packet of which the destination is MP1 (hereafter referred to as a packet R1) based on the read command, and transmits the packet R1 to SW0 (S101). The information of a packet type for the packet R1 is information that indicates a read. SW0 receives the packet R1 from CHA0 (S102), and judges whether the access is a high speed access or not (S103). In the case in which SW0 judges that the access is a high speed access (S103: YES), SW0 transfers the packet R1 from the SW port #3 to MP1 through the direct path (S104). On the other hand, in the case in which SW0 judges that the access is a low speed access (S103: NO), SW0 transfers the packet R1 from the SW port #1 or #2 to MP1 through the SW connection path (S6 and S7). In the case in which the read targeted data that complies with a read command from the host exists in CM1, a read start processing, a CM write processing, and a CM write completion report are skipped, and S122 is carried out.

Subsequently, a read start processing is carried out. More specifically, MP1 responds to the packet R1 transferred from CHA0, and transmits a packet of which the destination is DKA0 via SW0 (hereafter referred to as a packet R2) (S105, S108, S109, and S110). DKA0 responds to the packet R2, and reads the read targeted data from HDD112.

Subsequently, a CM write processing is carried out. More specifically, DKA0 transmits a packet of which the destination is CM1 (hereafter referred to as a packet R3) (S112). The packet R3 includes the information that indicates a write as the information of a command type and the read targeted data that has been read from HDD112. SW0 receives the packet R3 from DKA0 (S112), and judges whether the access is a high speed access or not (S113). In the case in which SW0 judges that the access is a high speed access (S113: YES), SW0 transfers the packet R3 from the SW port #4 to CM1 through the direct path (S114). On the other hand, in the case in which SW0 judges that the access is a low speed access (S113: NO), SW0 transfers the packet R3 from the SW port #1 or #2 to CM1 through the SW connection path (S117 and S118). CM1 responds to the packet R3 transferred from DKA0, and writes data in the packet R3 to CM1 (S115 and S119).

Subsequently, a CM write completion report is carried out. More specifically, CM1 transmits a packet of which the destination is MP1 (hereafter referred to as a packet R4) (S116 and S120).

Subsequently, a CM read DMA start processing is carried out. More specifically, MP1 responds to the packet R4, and generates a packet of which the destination is CHA0 (hereafter referred to as a packet R5) (S121). In the case in which the access is a high speed access (S122: YES), the access speed bit in the packet R5 is made a bit that indicates a high speed, and MP1 transfers the packet R5 through the MP port #1 (S123). On the other hand, in the case in which the access is a low speed access (S122: NO), the access speed bit in the packet R5 is made a bit that indicates a low speed, and MP1 transfers the packet R5 from the MP port #2 (S124). SW0 receives the packet R5, and transmits the packet R5 to CHA0 that is a destination of the packet R5 (S125 and S126).

Subsequently, a CM read proces sing is carried out. More specifically, CHA0 responds to the packet R5, generates a packet of which the destination is CM1 (hereafter referred to as a packet R6), and transmits the packet R6 to SW0 (S127). The packet R6 includes the information that indicates a read as the information of a command type. SW0 receives the packet R6 from DKA0 (S128), and judges whether the access is a high speed access or not (S129). In the case in which SW0 judges that the access is a high speed access (S129: YES), SW0 transfers the packet R6 from the SW port #4 to CM1 through the direct path (S130). On the other hand, in the case in which SW0 judges that the access is a low speed access (S129: NO), SW0 transfers the packet R6 from the SW port #1 or #2 to CM1 through the SW connection path (S132 and S133). CM1 responds to the packet R6 transferred from CHA0, reads data from CM1 (S131 and S134), and transmits a packet of which the destination is CHA0 (hereafter referred to as a packet R7) (S135 and S136). The packet R7 includes data that has been read from CM1.

Finally, a read completion report processing is carried out. More specifically, CHA0 responds to the packet R7, transmits data in the packet R7 to the host (S137), generates a packet of which the destination is MP1 (hereafter referred to as a packet R8), and transmits the packet R8 to SW0 (S138). SW0 receives the packet R8 from CHA0, and judges whether the access is a high speed access or not (S139). In the case in which SW0 judges that the access is a high speed access (S139: YES), SW0 transfers the packet R8 from the SW port #3 to MP1 through the direct path (S140). On the other hand, in the case in which SW0 judges that the access is a low speed access (S139: NO), SW0 transfers the packet R8 from the SW port #1 or #2 to MP1 through the SW connection path (S141 and S142). MP1 receives the packet R8 (S143).

The above described a flow of a processing that is carried out in the case in which a CHA0 receives a read command from a host.

For a processing flow described with reference to FIGS. 11 and 12, there is at least one of the following three cases A to C as a case in which an access must be a high speed access:
(Case A) a case in which data that requires a high speed processing is read or written;
(Case B) a case in which any one of modules does not operate normally;
(Case C) a case in which it is decided that a high speed access is preferable from an operational status of a module.

In the case A, the host 100 sets a high speed access or a low speed access to CHA0. The setting is carried out by the host 100 every when the host 100 transmits an I/O command (a write command or a read command). More specifically, an I/O command from the host 100 includes the information that indicates a high speed or a low speed as the information that indicates an access speed for instance. In the case in which a high speed access is set, CHA0 sets an access speed bit in the packet to be transmitted to "1" (high speed).

In the case B, in the case in which a packet is transmitted after a point of time when it is detected in a PK (such as an MP) that a module does not operate normally (for instance, a point of time when it is detected that a failure occurs in one of duplicated PKs), a PK of the transmitting source of the packet (CHA, DKA, MP, or SW) sets an access speed bit in the packet to "1" (high speed). Even in the case in which an'access speed bit "0" (low speed) is set in the packet that has been received (even in the case in which a low speed access is set to CHA0), an access speed bit in a transmission targeted packet can be set to "1".

As an example of the case C, it is thought that a SW connection path is highly loaded by frequently receiving a packet to which a low speed access is set. In this case, even in the case in which a low speed access is set to the packet that has been received, a high speed access is set to a packet to be transmitted, and the packet can be transmitted through a direct path.

The following four cases in a processing flow described with reference to FIGS. 11 and 12 will be described below in detail:
(Case 1) an access from CHA0 to CM1 or MP1 via SW0;
(Case 2) an access from DKA0 to CM1 or MP1 via SW0;
(Case 3) an access from MP0 to CM1 or MP1 (as well as DKA1 or CHA1) via SW0;
(Case 4) a response from CM1 (a CM write completion report processing).

<For Case 1 and Case 2>

Figure 13:
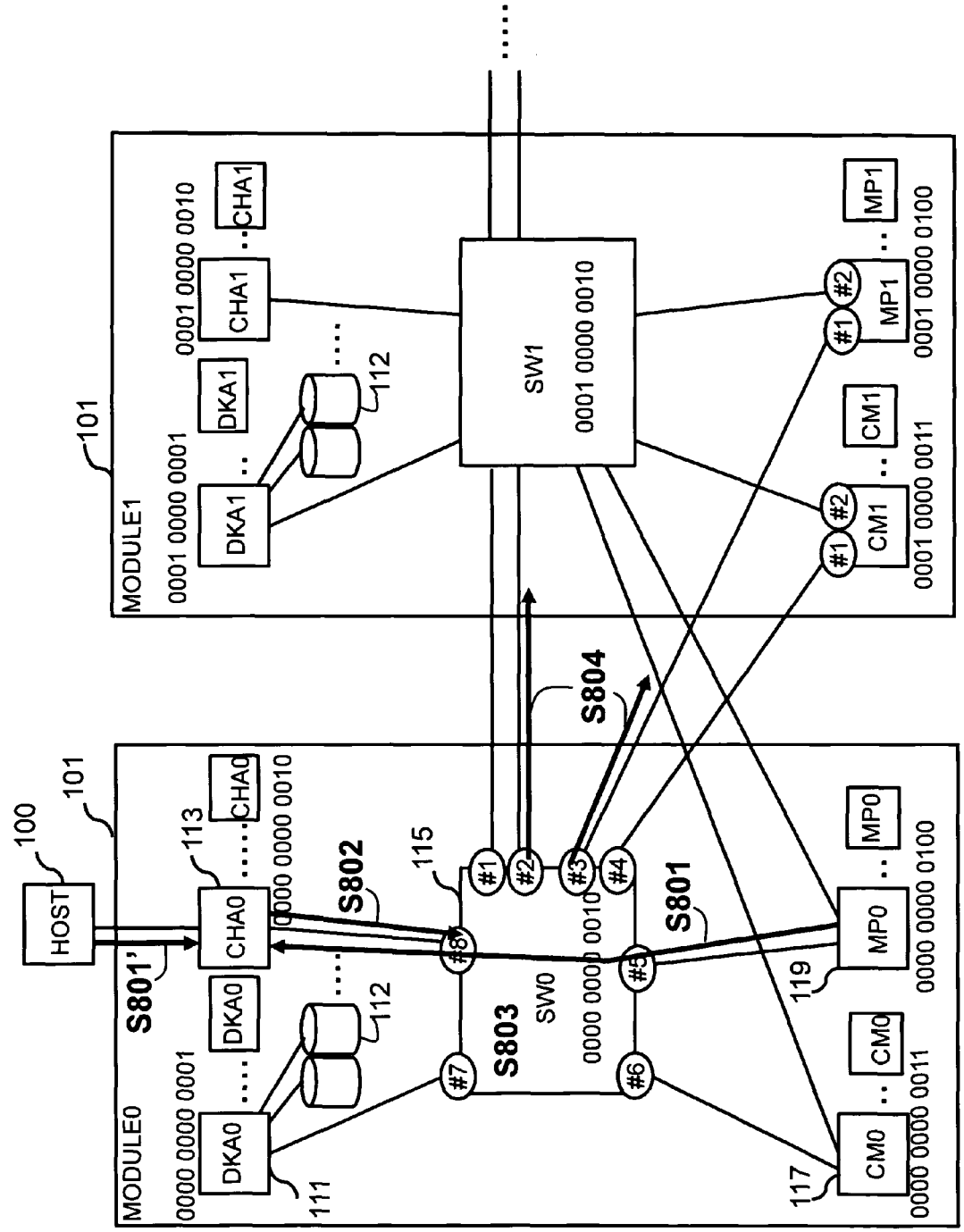
FIG. 13 is a schematic view showing a flow of an access in a case 1.
Figure 14:
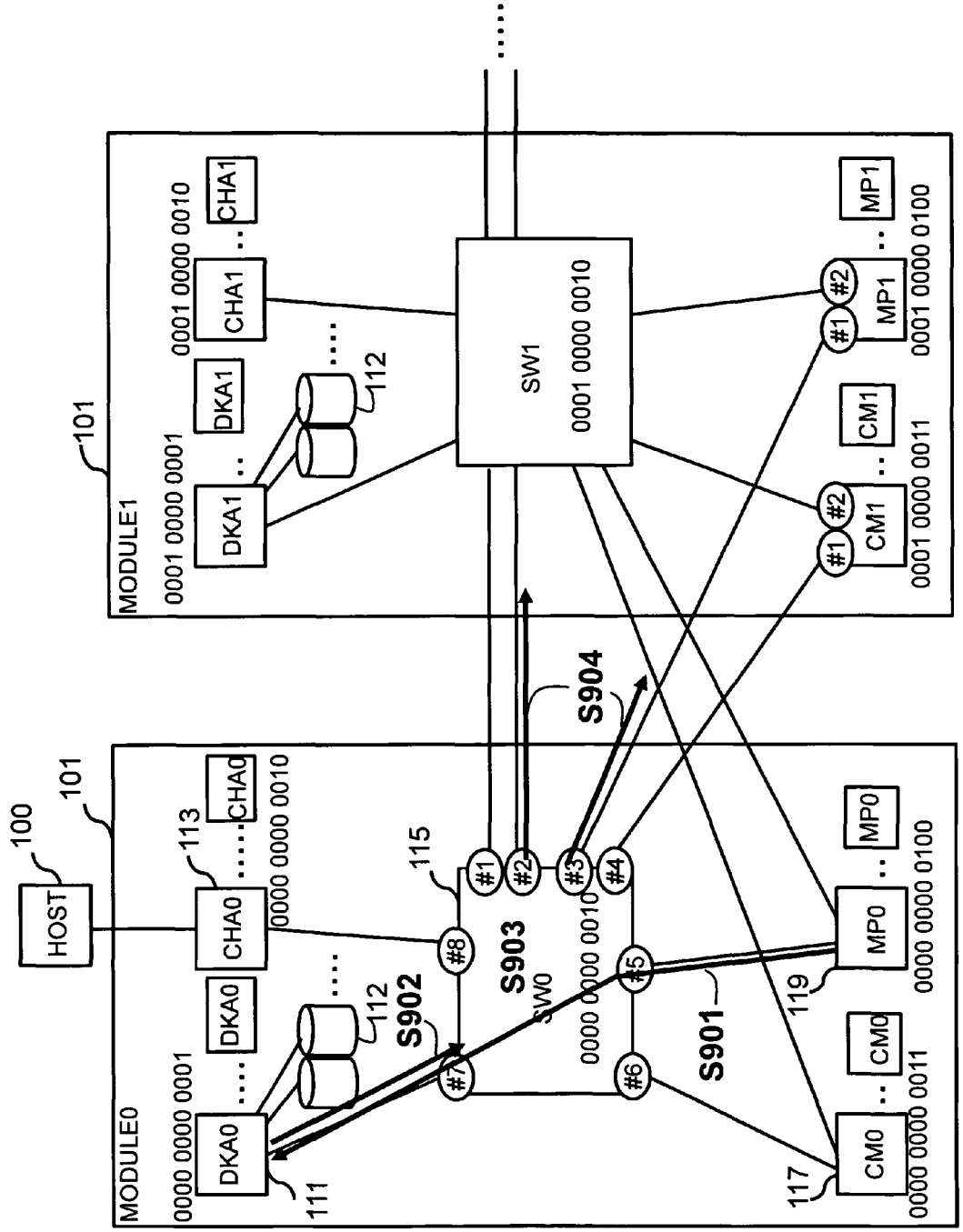
FIG. 14 is a schematic view showing a flow of an access in a case 2.
Figure 15:
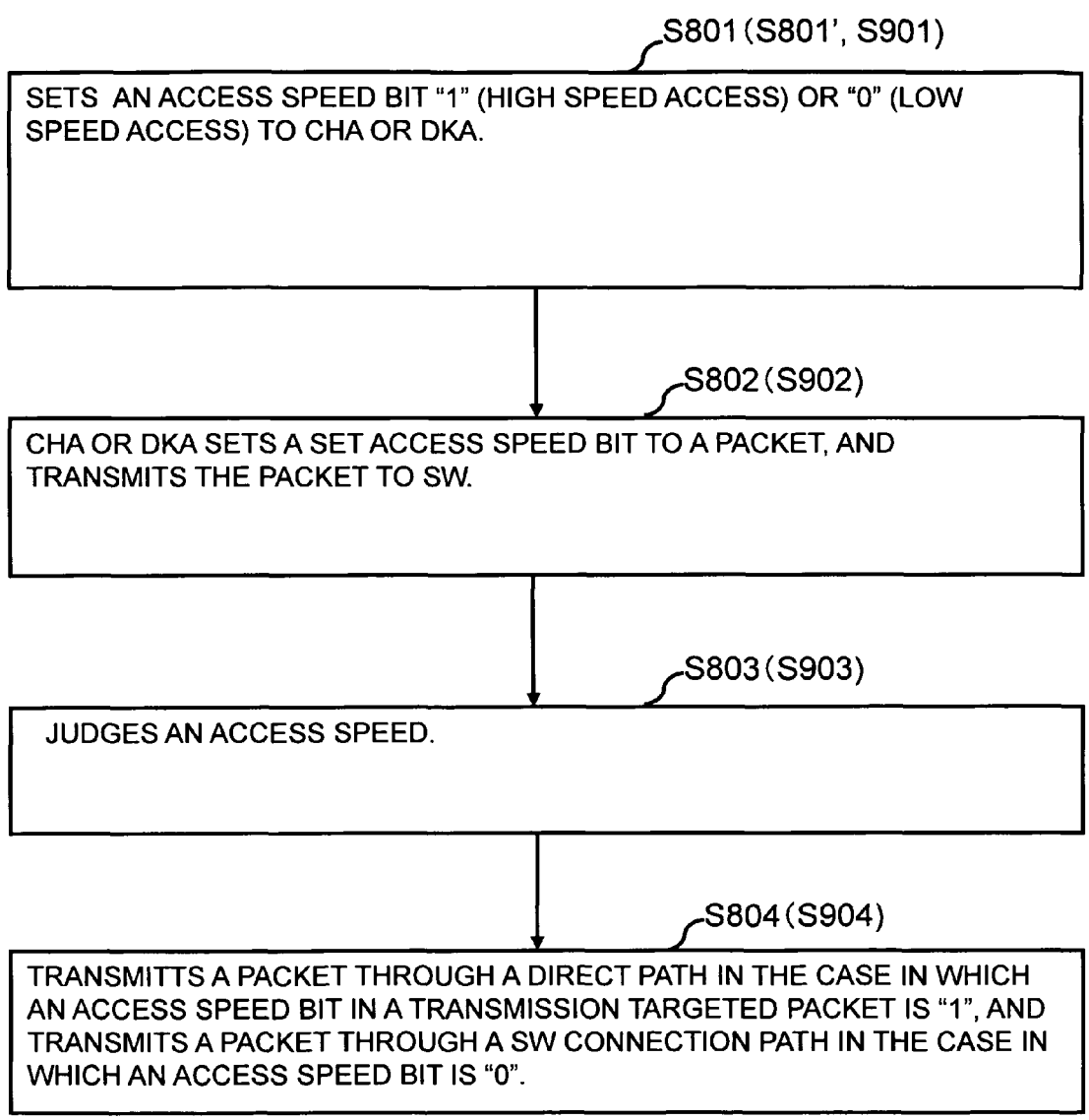
FIG. 15 shows a flow of a processing in the case 1 and the case 2.

FIG. 13 is a schematic view showing a flow of an access in a case 1. FIG. 14 is a schematic view showing a flow of an access in a case 2. FIG. 15 shows a flow of a processing in the case 1 and the case 2. The case 1 and the case 2 will be described below with reference to FIGS. 13 to 15.

In S801, MP0 sets a high speed access or a low speed access to CHA0.

In S801', the host 100 sets a high speed access or a low speed access to CHA0.

In D901, MP0 sets a high speed access or a low speed access to DKA0.

In S802 (S902), CHA0 (DKA0) sets an access speed bit that complies with the access speed information (a high speed access or a low speed access) that has been set to CHA0 (DKA0) to a packet, and transmits the packet.

In S803 (S903), SW0 judges that an access is a high speed access or a low speed access.

In S804 (S904), in the case in which a high speed access is set to a transmission targeted packet, SW0 transmits the packet through a direct path. On the other hand, in the case in which a low speed access is set to a transmission targeted packet, SW0 transmits the packet through a SW connection path.

Figure 16:
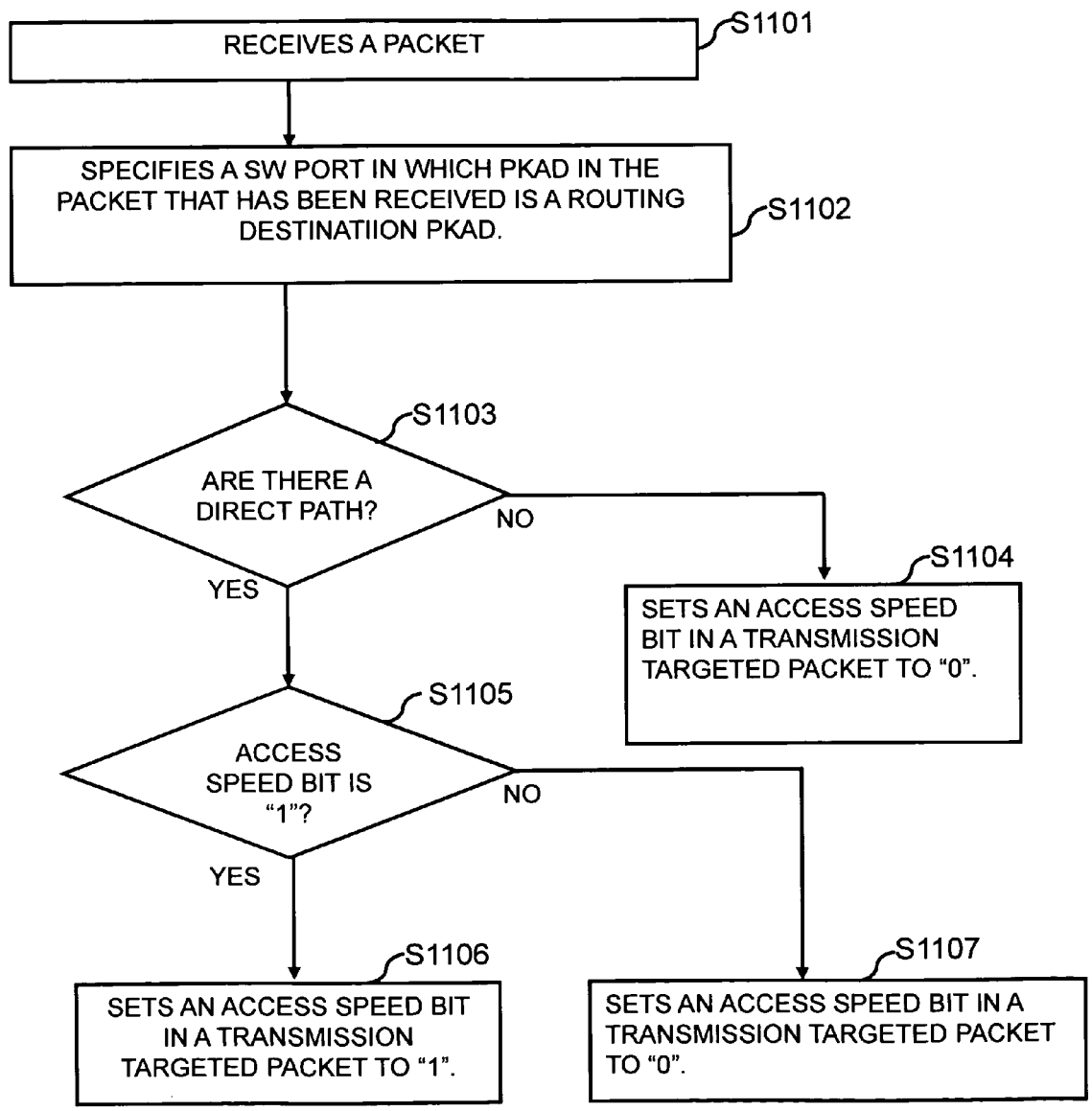
FIG. 16 shows the details of a processing of S803 (S903) in FIG. 15.

FIG. 16 shows the details of a processing of S803 (S903) in FIG. 15.

In S1101, SW0 receives a packet from CHA0 (or DKA0).

In S1102, SW0 refers to a routing table included in SW0, and specifies a SW port in which PKAD in the packet that has been received in S1101 is a routing destination PKAD.

In the case in which the SW port that has been specified in S1102 does not include a SW port that is connected to a direct path (S1103: NO), SW0 sets a low speed access (an access speed bit "0") to a transmission targeted packet in S1104.

In the case in which the SW port that has been specified in S1102 includes a SW port that is connected to a direct path (S1103: YES), SW0 judges whether an access speed bit in a packet has been received in S1101 is "1" (high speed) or not in S1105.

In the case in which an access speed bit in a packet has been received in S1101 is "1" (high speed) (S1105: YES), SW0 sets a high speed access (an access speed bit "1") to a transmission targeted packet in S1106.

In the case in which an access speed bit in a packet has been received in S1101 is "0" (low speed) (S1105: NO), SW0 sets a low speed access (an access speed bit "0") to a transmission targeted packet in S1107.

<For Case 3>

Figure 17:
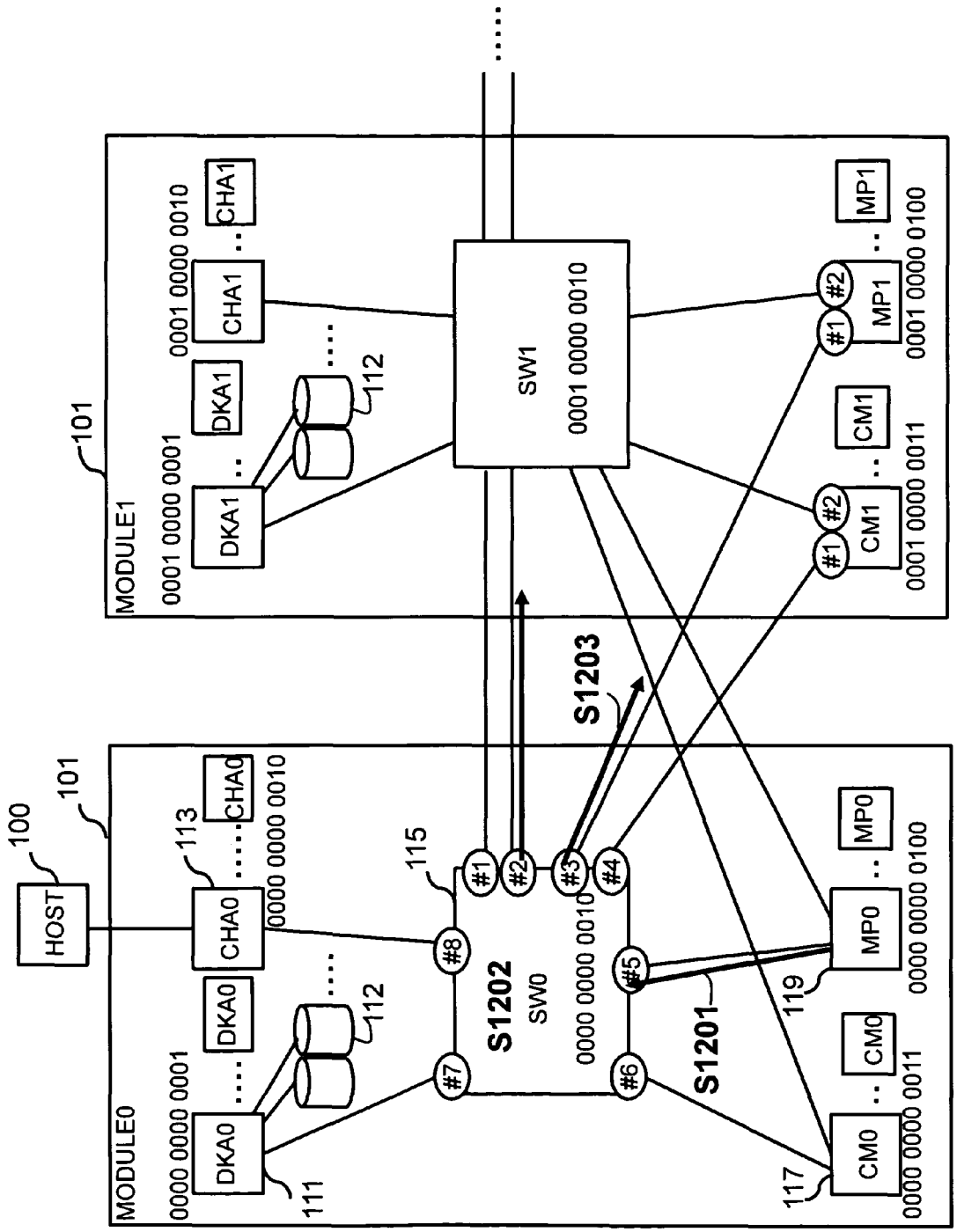
FIG. 17 is a schematic view showing a flow of an access in a case 3.
Figure 18:
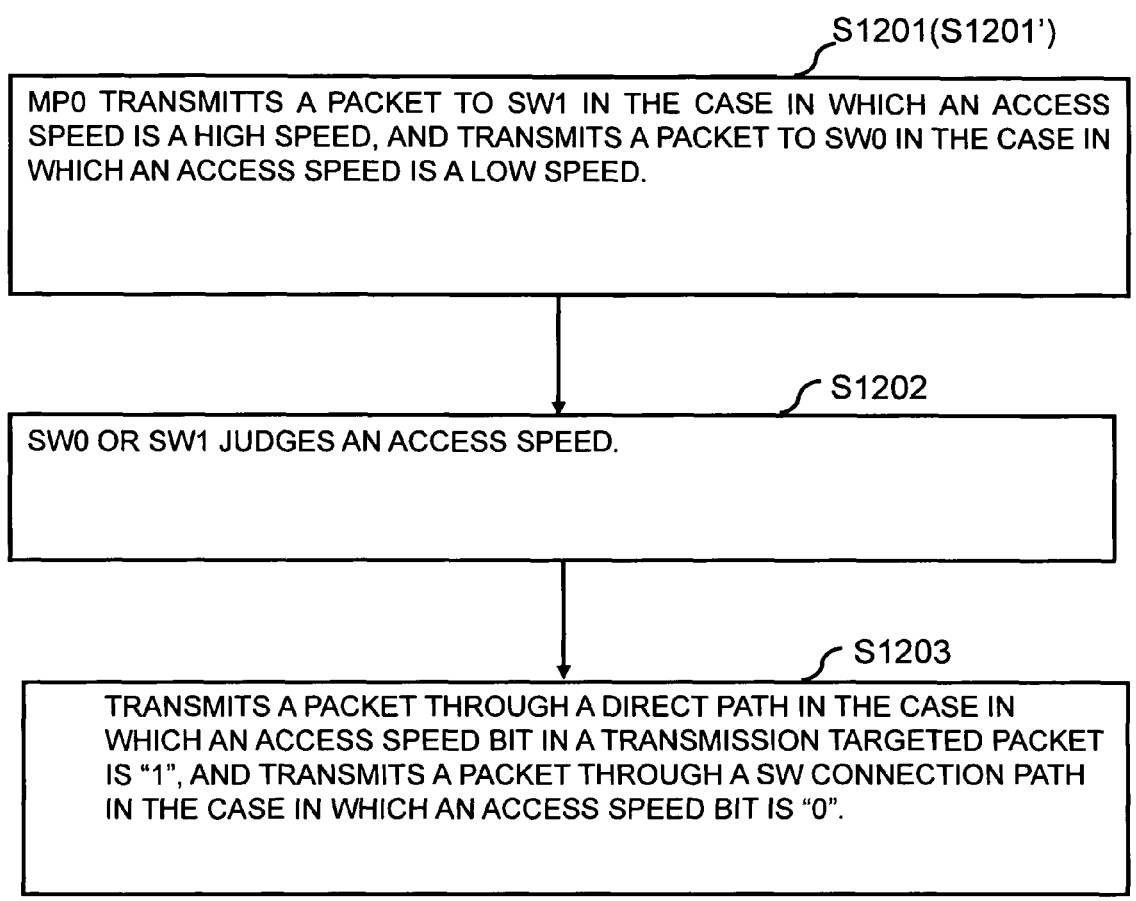
FIG. 18 shows a flow of a processing in the case 3.

FIG. 17 is a schematic view showing a flow of an access in a case 3. FIG. 18 shows a flow of a processing in the case 3. The case 3 will be described below with reference to FIGS. 17 and 18.

In S1201, MP0 judges whether a high speed access is required for an access to a module 1 or not, sets an access speed bit that complies with a result of the judgment to a transmission targeted packet, and transmits the packet.

In S1202, SW0 judges that an access is a high speed access or a low speed access based on an access speed bit in a packet has been received from MP0. A processing equivalent to that of S803 (S903) in FIGS. 13 to 15 is carried out in S1202.

In S1203, in the case in which a high speed access is set to a transmission targeted packet, SW0 transmits the packet through a direct path. On the other hand, in the case in which a low speed access is set to a transmission targeted packet, SW0 transmits the packet through a SW connection path.

Figure 19:
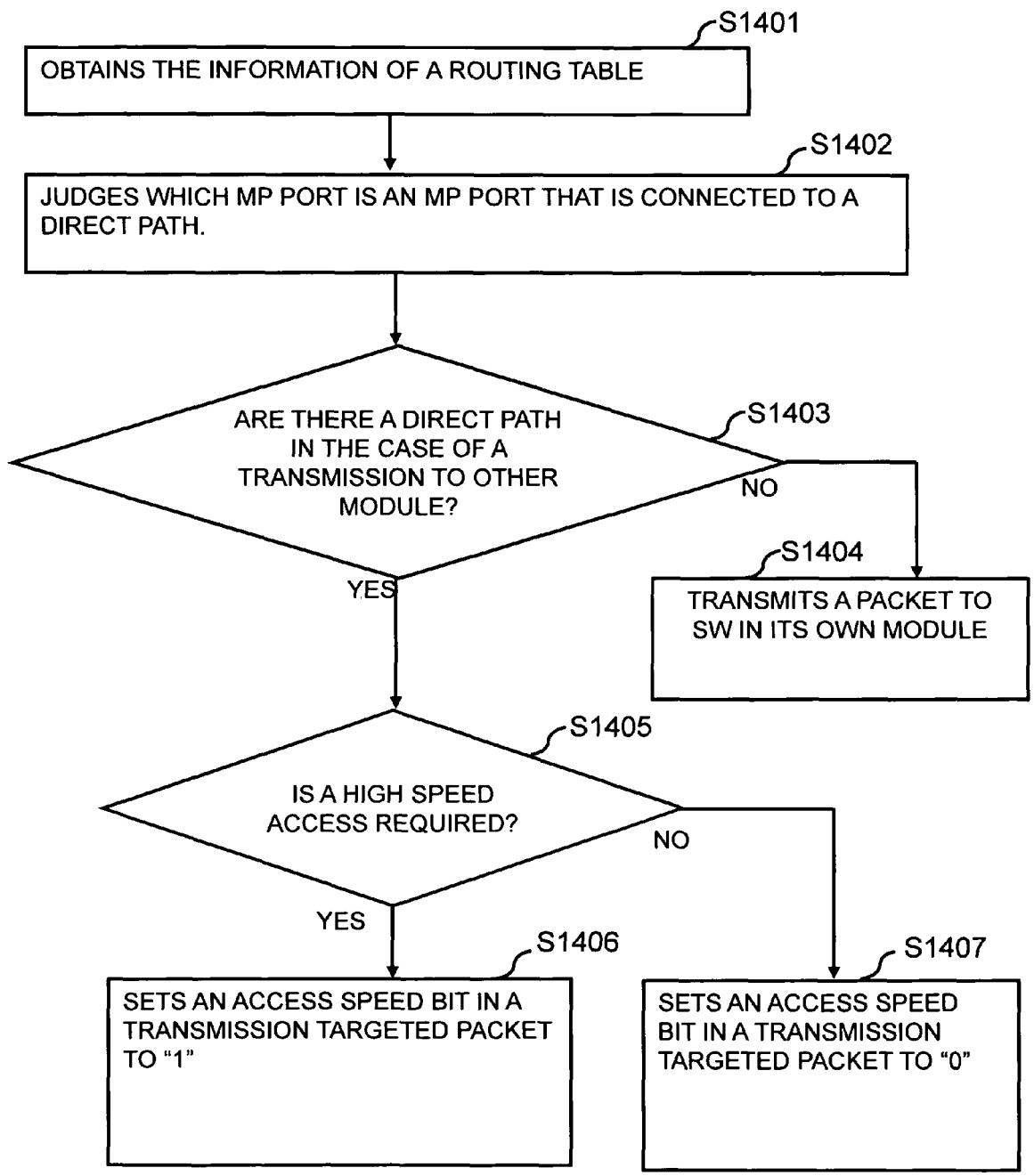
FIG. 19 shows the details of a processing of S1201 in FIG. 18.

FIG. 19 shows the details of a processing of S1201 in FIG. 18.

In S1401, MP0 obtains the information of a routing table that is held by SW0 from SW0. In S1402, MP0 judges which MP port of its own is an MP port that is connected to a direct path based on the information of a routing table. The S1401 and S1402 can be carried out in advance.

In S1403, MP0 judges whether a PK of a destination of a packet is a PK that is connected to a direct path or not.

In the case in which a result of the judgment of S1403 is negative (S1403: NO), MP0 sets a low speed access to a transmission targeted packet, and transmits the packet from an MP port that is connected to SW0 (an MP port that is not connected to a direct path) in S1404.

In the case in which a result of the judgment of S1403 is positive (S1403: YES), MP0 judges whether a high speed access is set to a transmission targeted packet or not in S1405. A case in which it is decided that a setting of a high speed access is necessary is for instance the case B and the case C described above.

In the case in which a result of the judgment of S1405 is positive (S1405: YES), MP0 sets a high speed access to a transmission targeted packet, and transmits the packet through a direct path that is connected to MP0 (transmits the packet from an MP port that is connected to SW1) in S1406.

In the case in which a result of the judgment of S1405 is negative (S1405: NO), MP0 sets a low speed access to a transmission targeted packet, and transmits the packet through a direct path that is connected to MP0 (transmits the packet from an MP port that is connected to SW0) in S1407.

<For Case 4>

Figure 20:
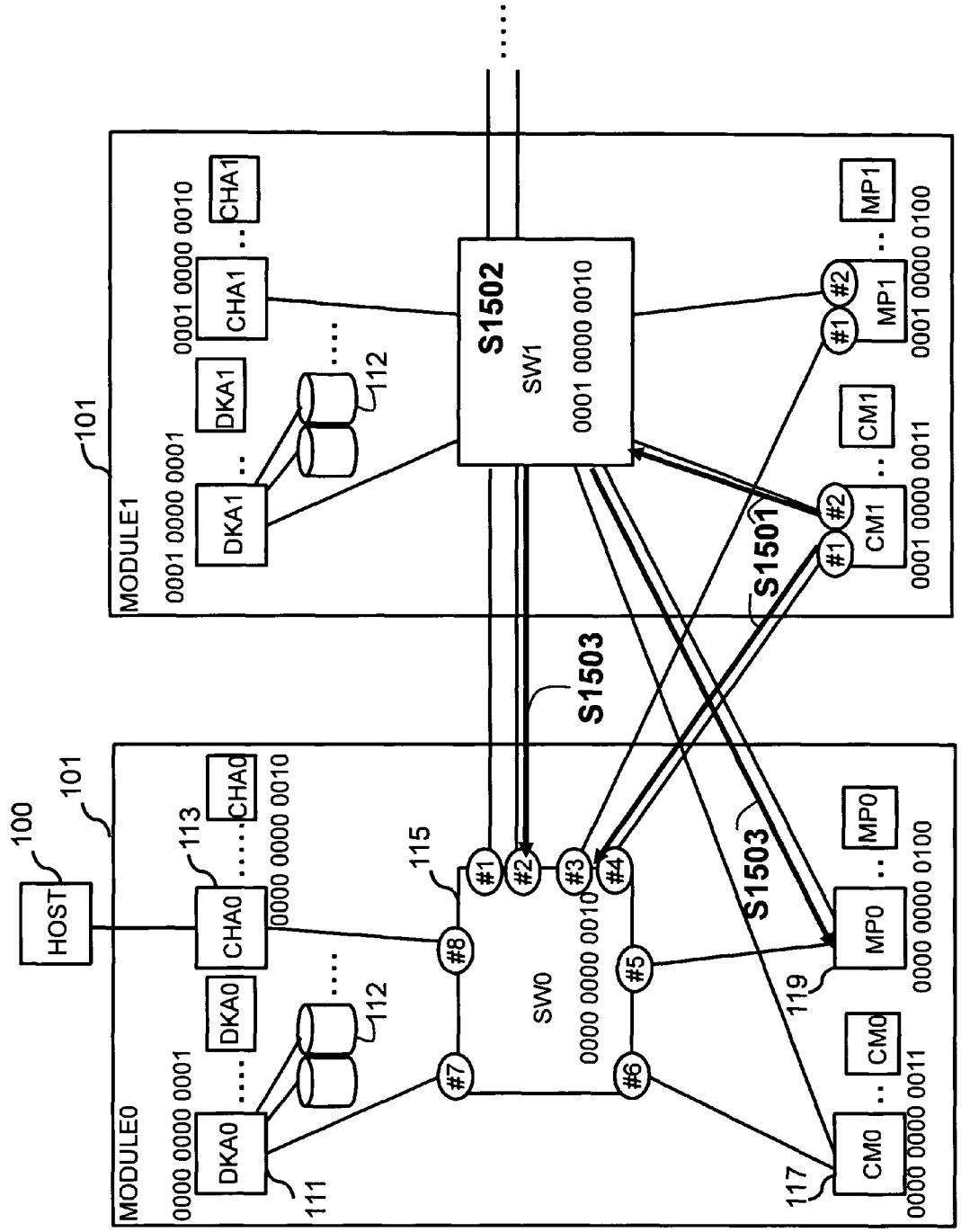
FIG. 20 is a schematic view showing a flow of an access in a case 4.
Figure 21:
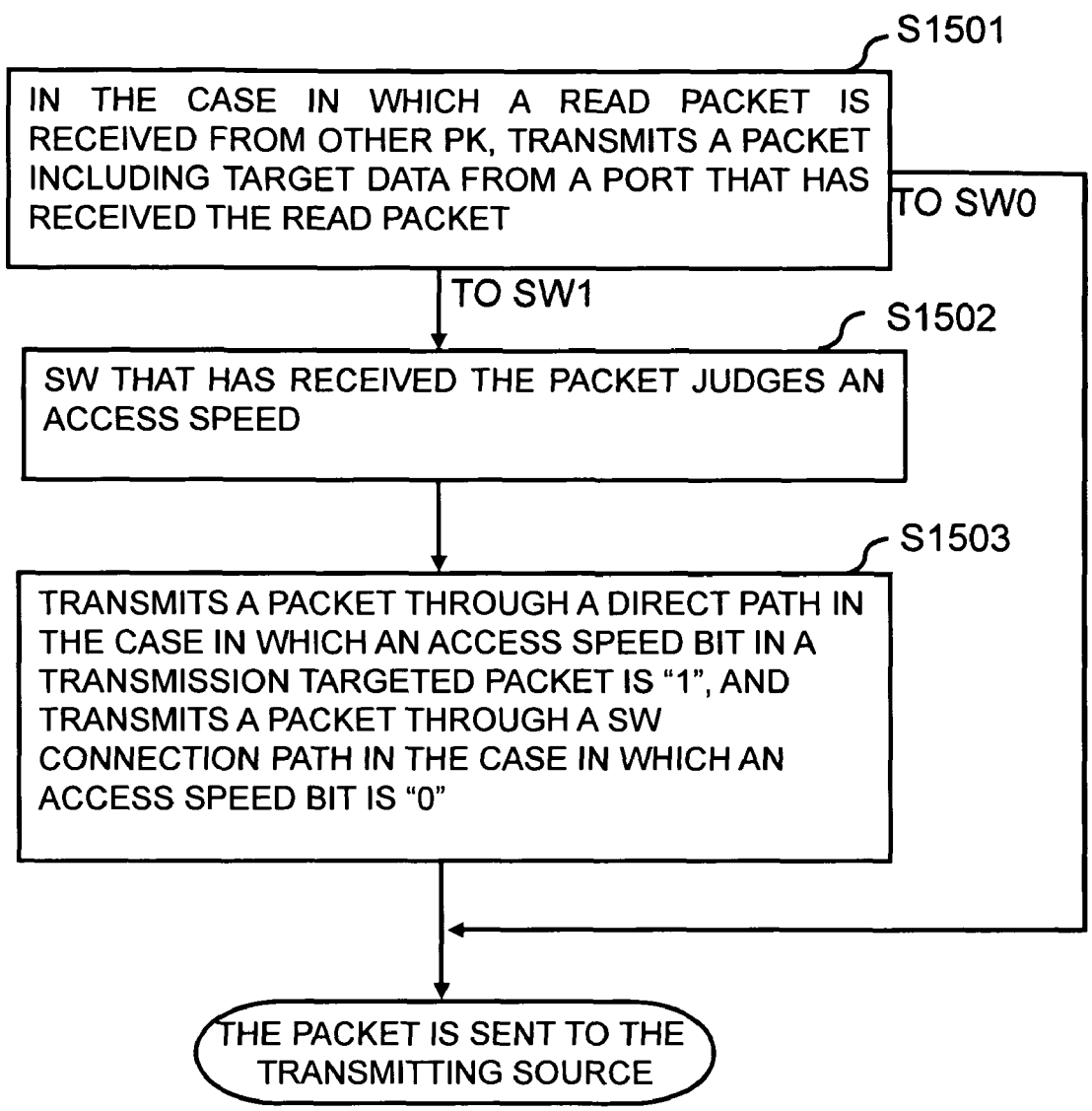
FIG. 21 shows a flow of a processing in the case 4.

FIG. 20 is a schematic view showing a flow of a response in a case 4. FIG. 21 shows a flow of a processing in the case 4.

In S1501, CM1 responds to a packet to which a read is set (hereafter referred to as a read packet in the descriptions of FIGS. 20 and 21), and transmits a packet including data that has been read from CM1. At this time, CM1 sets an access speed bit having a value equivalent to that of an access speed bit in the read packet to a transmission targeted packet. More specifically, in the case in which an access speed bit "1" is set to the read packet, an access speed bit "1" is set to a packet to be transmitted. A transmission targeted packet is transmitted from a CM port (a port included in CM) equivalent to a CM port that has received the read packet.

In the case in which a packet is transmitted from CM1 via a direct path, the packet is transmitted to PK0 of the transmitting source of the read packet via SW0.

On the other hand, in the case in which a packet is transmitted from CM1 to SW1, the following S1502 and S1503 are carried out.

In S1502, SW1 judges that an access is a high speed access or a low speed access based on an access speed bit in a packet has been received from CM1. A processing equivalent to that of S803 (S903) in FIGS. 13 to 15 is carried out in S1502.

In S1503, in the case in which a high speed access is set to a transmission targeted packet, SW1 transmits the packet through a direct path. On the other hand, in the case in which a low speed access is set to a transmission targeted packet, SW1 transmits the packet through a SW connection path.

Figure 22:
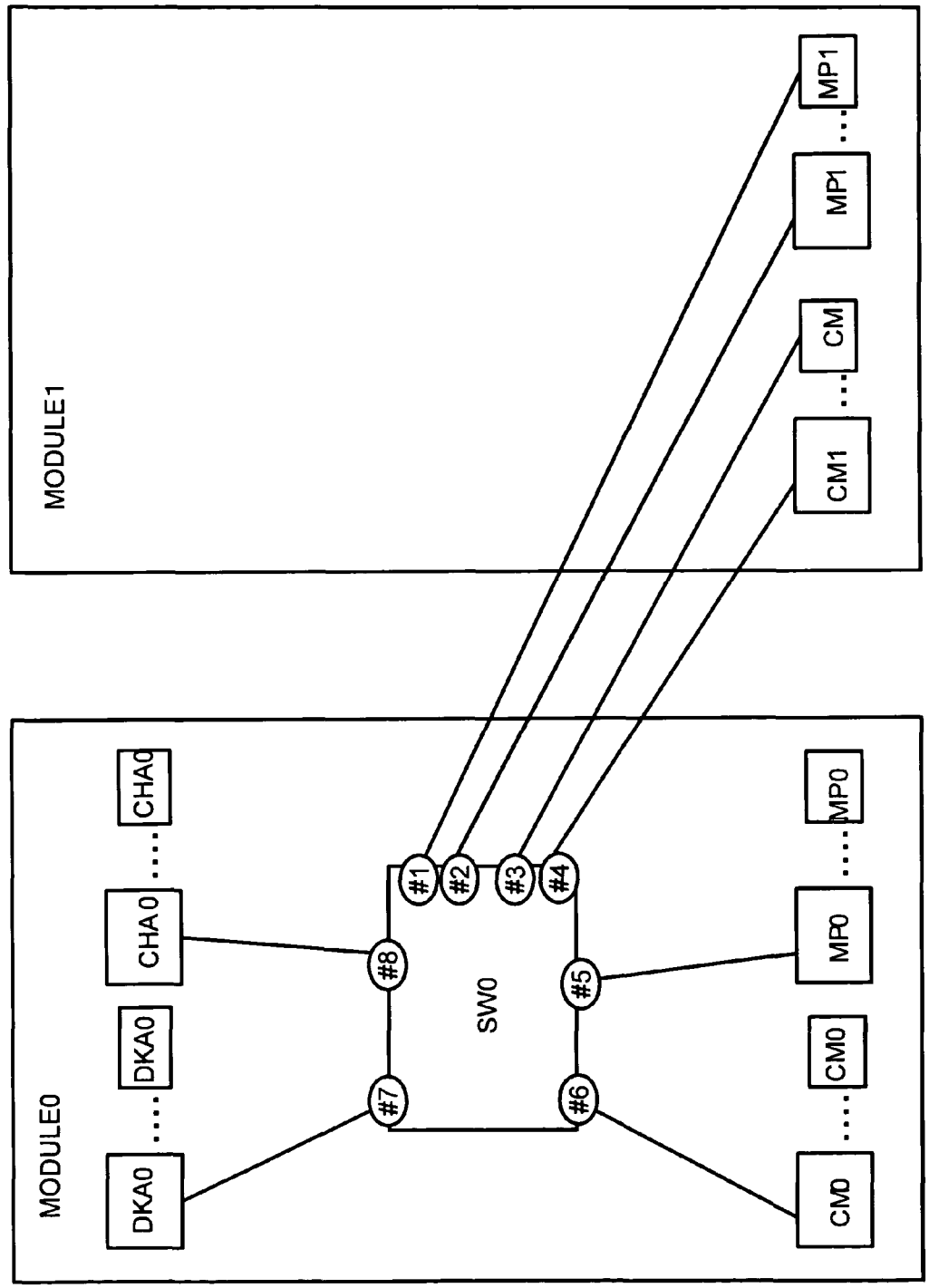
FIG. 22 shows a modified example of a connection between modules.

The above described the first embodiment of the present invention. As a modified example of the first embodiment of the present invention, SW1 can be excluded from the module 1 as shown in FIG. 22. In this case, an access from SW0 to CM1 and MP1 is carried out through a direct path certainly.

Embodiment 2

A second embodiment of the present invention will be described below. Here, a point different from the first embodiment of the present invention is mainly described, and the detailed descriptions of a common point with the first embodiment of the present invention are omitted or simplified.

Figure 23:
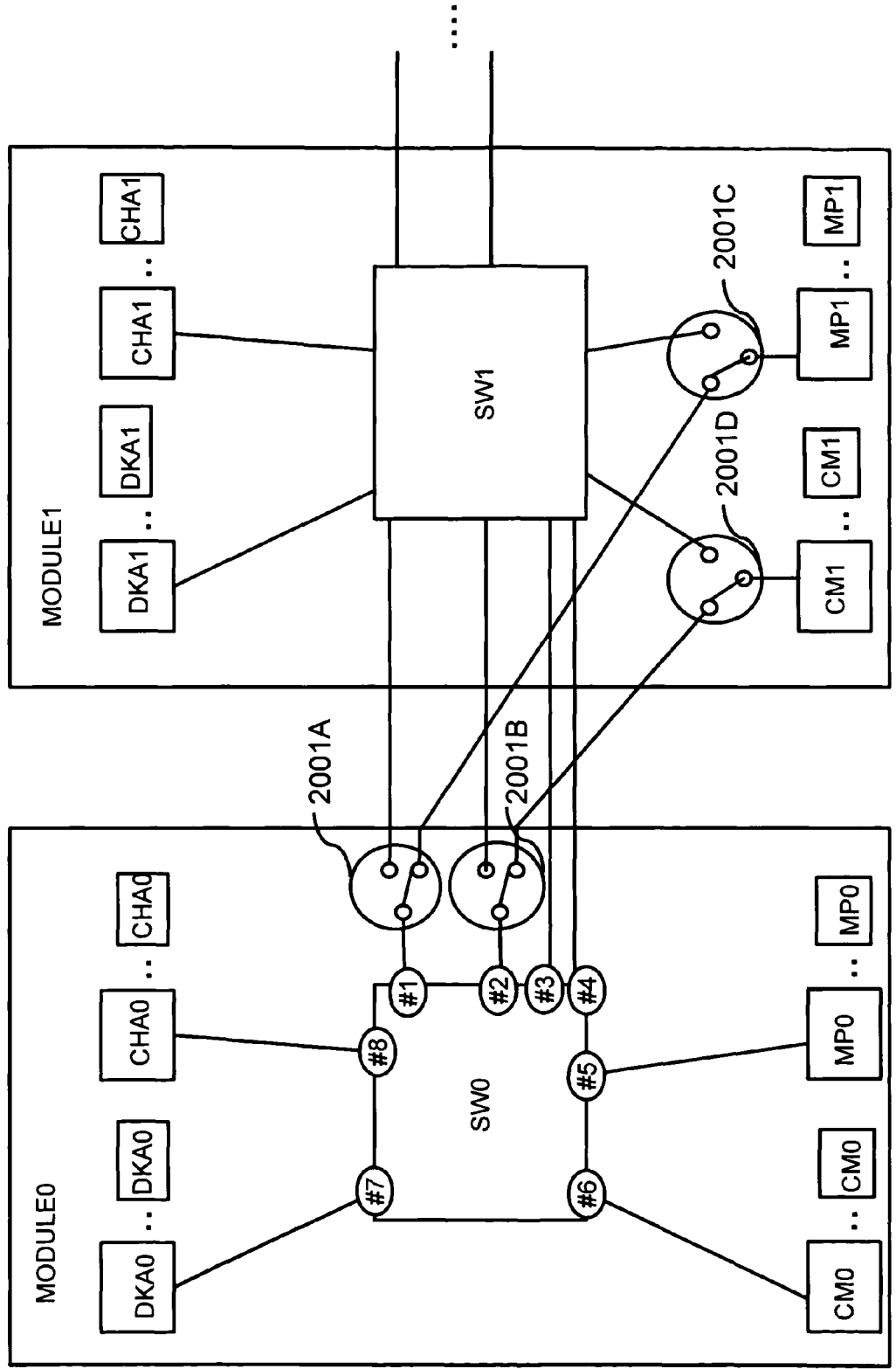
FIG. 23 shows a configuration example of a storage system in accordance with a second embodiment of the present invention.

FIG. 23 shows a configuration example of a storage system in accordance with the second embodiment of the present invention.

Each module 901 is provided with a path switch. The path switch is a device for switching an access through a direct path and an access through a SW connection path.

By an example of FIG. 23, a module 0 is provided with a path switch 2001A and a path switch 2001B, and a module 1 is provided with a path switch 2001C and a path switch 2001D. The path switch 2001A and the path switch 2001C connected to the path switch 2001A configure a first switch set, and the path switch 2001B and the path switch 2001D connected to the path switch 2001B configure a second switch set. In the case in which the first switch set (the second switch set) is in an ON state (more specifically, in the case in which both the path switch 2001A and the path switch 2001C (the path switch 2001B and the path switch 2001D) that configure the first switch set (the second switch set) are in an ON state), SW0 can transmit a packet from the SW port #1 (#2) of SW0 to MP1 (CM1) through the direct path. On the other hand, in the case in which the first switch set (the second switch set) is in an OFF state (more specifically, in the case in which both the path switch 2001A and the path switch 2001C (the path switch 2001B and the path switch 2001D) that configure the first switch set (the second switch set) are in an OFF state), SW0 can transmit a packet from the SW port #1 (#2) of SW0 to MP1 (CM1) through the SW connection path.

The on/off state of the path switch can be switched manually by a person (such as a manager), and can be switched automatically corresponding to a signal from a PK (such as MP and SW). In the following, MP0 and MP1 carry out a path switching.

A switching of the on/off state of the path switch can be carried out at a variety of timing. In this embodiment of the present invention, the switching is carried out at any of the following timing (A) and (B):

(A) a module is added or reduced;
(B) an operational status of the storage system is changed to a specific status (for instance, a load of a direct path is raised).

MP0 or MP1 carries out a path switch processing shown in FIG. 24 in the case in which the above (A) or (B) is detected. In the case in which a switch set to be switched is in an ON state already, the switch set is switched to an OFF state by the path switch processing. On the contrary, in the case in which a switch set to be switched is in an OFF state already, the switch set is switched to an ON state.

The path switch processing will be described below using MP0 as an example with reference to FIG. 24. In this case, a switch set to be switched is a first switch set.

In S3001, MP0 blocks the SW port #1 that is connected to a path switch 2001A. Since a block of the SW port #1 is carried out, the state information corresponding to the SW port #1 is updated to "block" for a port control table that is controlled by MP0 for instance (see FIG. 25). The port control table is provided with a port number and state information for each SW port, and is stored in a memory that is held by CM0 or MP1.

In S3002, MP0 switches the on/off state of the path switch 2001A.

In S3003, MP0 opens the SW port #1. Since an opening of the SW port #1 is carried out, the state information corresponding to the SW port #1 is updated to "open" for the port control table described above for instance (see FIG. 25).

In S3004, MP0 updates the routing table to SW0.

In the case in which a series of processing described above is completed, SW0 can transmit a packet through a path after switching.

By the above configuration, one SW port, one MP port, and one CM port can be used for an access through a direct path and an access through a SW connection path. Consequently, it can be expected to reduce the number of SW ports, MP ports, and CM ports, and/or it can be expected to process an I/O command at a higher speed. For instance, in the case in which a frequency of an access to CM1 or MP1 is less, a SW connection path can be increased by carrying out the path switch processing in which at least one of the SW ports #1 and #2 is connected to a SW connection path, whereby it can be expected to carry out an access to DKA1 and/or CHA1 via SW0 at a higher speed.

An example of a flow for carrying out the path switch processing will be described below.

At first, a storage system is composed of a module 0 only. Then, a module 1 is added.

Figure 26:
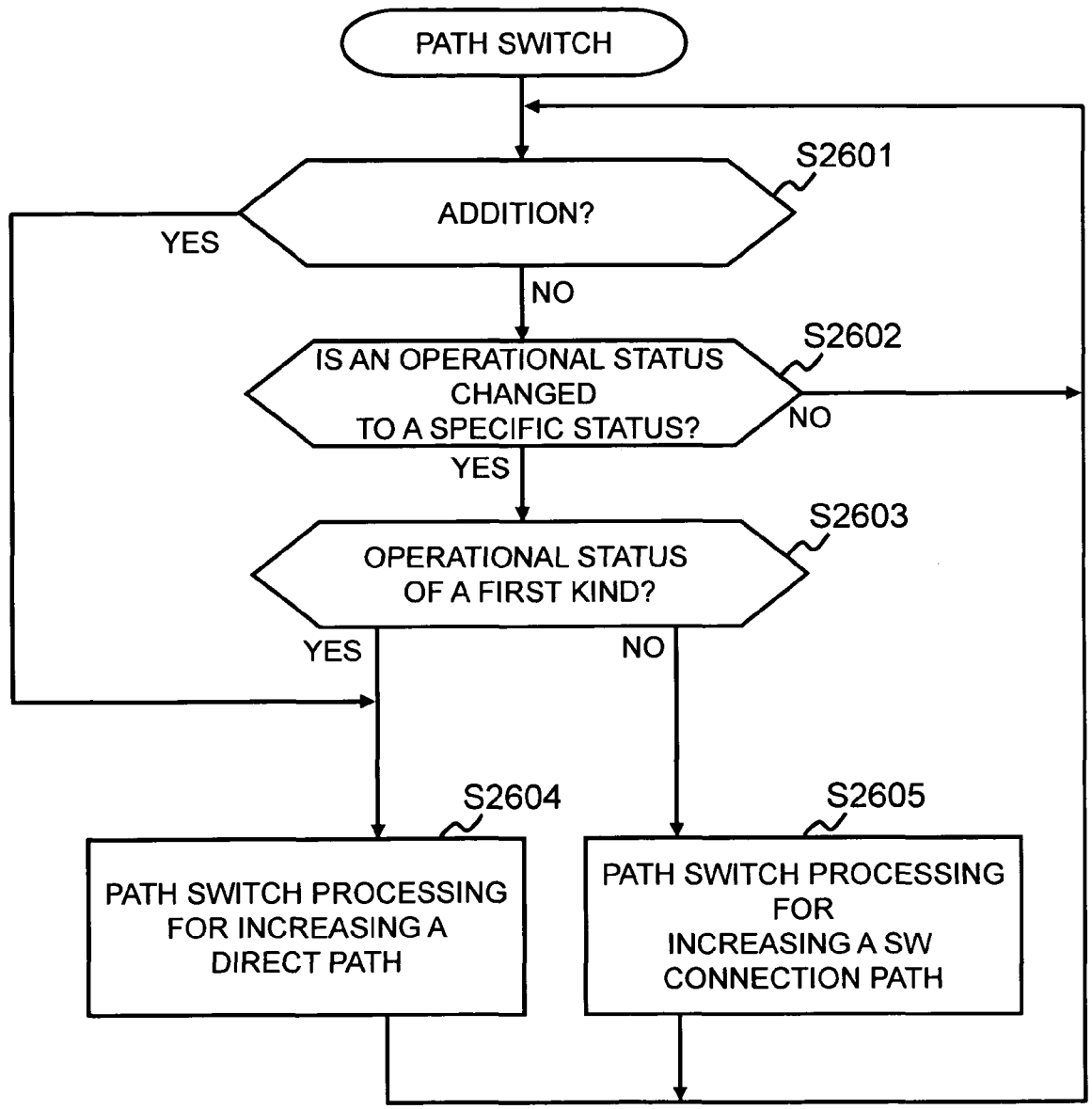
FIG. 26 shows a flow of a path switch processing.

At this time, as shown in FIG. 26, MP0 (and MP1) detects an addition of the module 1 (S2601: YES), and carries out the path switch processing for increasing a direct path (S2604).

After that, in the case in which MP0 detects that an operational status is changed to an operational status of a first kind (S2602: YES, S2603: NO), MP0 carries out the path switch processing for increasing a SW connection path (S2605). As an operational status of a first kind, a status in which a frequency of an access from the module 0 to MP1 and CM1 is less than a first threshold value is thought for instance.

Moreover, after that, in the case in which MP detects that an operational status is changed to an operational status of a second kind (S2602: YES, S2603: NO), MP carries out the path switch processing for increasing a direct path (S2604). As an operational status of a second kind, a status in which a frequency of an access from the module 0 to MP1 and CM1 is a second threshold value or more (the second threshold value is larger than or equivalent to the first threshold value) is thought for instance.

Each case in the above flow will be described below in detail.

<Before an Addition of the Module 1>

Figure 27:
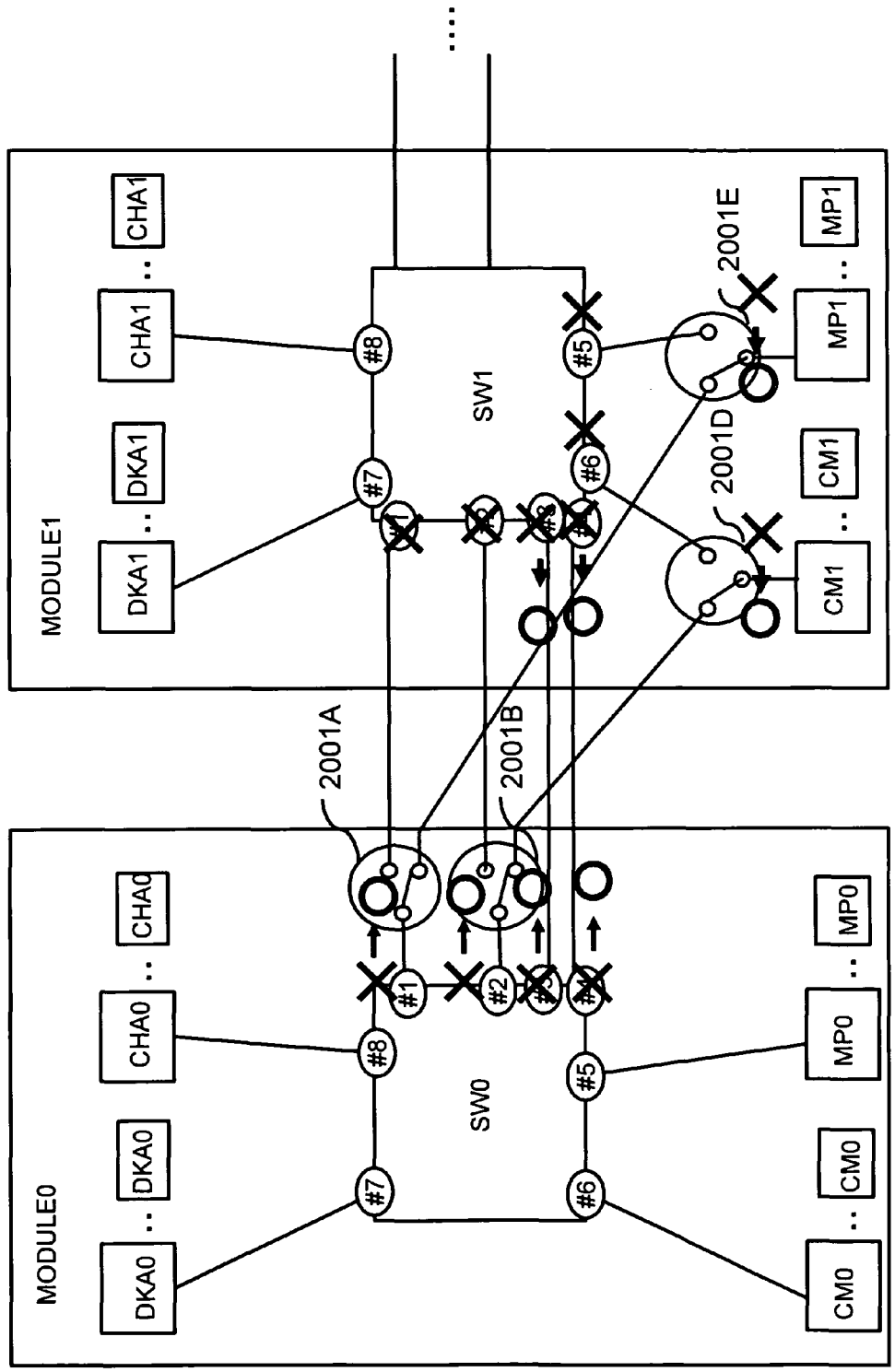
FIG. 27 is a schematic view showing a path switching in an addition of a module 1.

Before an addition of the module 1, a PK is not connected to the SW ports #1 to #4 of SW0. Consequently, as shown in FIG. 27, a state of the SW ports #1 to #4 is in a block state as shown by a mark X. FIG. 28 shows a routing table of SW0 (hereafter referred to as a routing table 0). More specifically, a connecting destination PKAD and a routing destination PKAD are not recorded for the SW ports #1 to #4 in the routing table 0.

Similarly, for the module 1 before an addition thereof, a state of the SW ports #1 to #6 of SW1, a state of the CM port of CM1, and a state of the MP port of MP1 are in a block state. FIG. 29 shows a routing table of SW1 (hereafter referred to as a routing table 1). More specifically, a connecting destination PKAD and a routing destination PKAD are not recorded for the SW ports #1 to #6 in the routing table 1.

<Addition of the Module 1>

As shown in FIG. 27, in the case in which the module 1 is added, MP0 switches a state of the path switches 2001A and 2001B to an ON state, and MP1 switches a state of the path switches 2001C and 2001D to an ON state. After that, MP0 switches a state of the SW ports #1 to #4 of SW0 from a block state to an open state. Similarly, MP1 switches a state of the SW ports #1 to #6 of SW1 from a block state to an open state.

After that, SW0 updates the routing table 0 to the routing table 0 shown in FIG. 30. More specifically, SW0 obtains a module ID, a slot ID, and a PKID from a PK connected to the SW ports #1 to #4 via the SW ports #1 to #4, and generates a PKAD. SW0 then registers the generated PKAD to the routing table 0 as a connecting destination PKAD (and a routing destination PKAD). At this time, SW0 sets a direct path flag "1" (a circle mark in FIG. 30) for the SW ports #1 and #2 having the same connecting destination PKAD and the same routing destination PKAD. In the case in which a connecting destination is SW1, SW0 receives a module ID, a slot ID, and a PKID of PK1 connected to SW1. Consequently, SW0 registers a PKAD that has been generated based on the module ID, the slot ID, and the PKID to the routing table 0 as a routing destination PKAD.

Similarly, SW1 updates the routing table 1 to the routing table 1 shown in FIG. 31.

After the routing tables 0 and 1 are updated, both an access from SW0 to CM1 or MP1 through a direct path and an access from SW0 to CM1 or MP1 through a SW connection path are enabled.

<In a Detection of an Operational Status of a First Kind>

Figure 32:
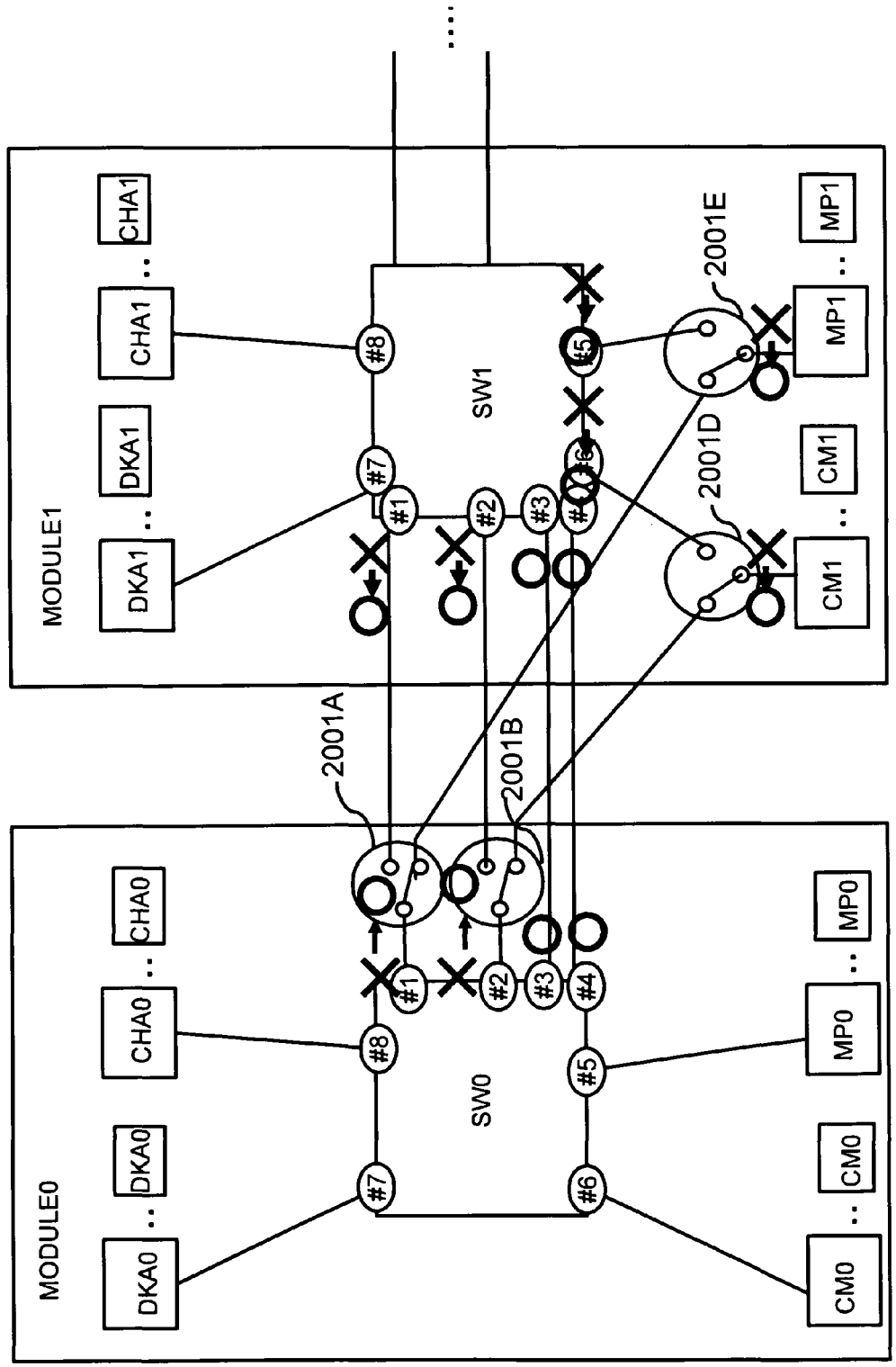
FIG. 32 is a schematic view showing a path switching in a detection of an operational status of a first kind.

In the case in which an operational status of a first kind is detected after an addition of the module 1 for instance, a path switch processing is carried out for increasing a SW connection path as shown in FIG. 32. That is, a SW connection path is adopted as substitute for a direct path.

More specifically, in the case in which MP0 detects an operational status of a first kind for instance, MP0 refers to a routing table 0, and specifies the SW ports #3 and #4 that are connected to a direct path. MP0 then switches both a state of the SW ports #1 and #2 that are connected to the path switches 2001A and 2001B and a state of the specified SW ports #3 and #4 from an open state to a block state. When a state of the specified SW ports #1 to #4 is in a block state, MP0 can suspend a reception of an I/O command from the host 100 (for instance, a specific response (such as a busy) can be returned to the host 100), and can receive an I/O command from the host 100. In the case in which MP0 receives an I/O command from the host 100, MP0 processes the I/O command if it is unnecessary to transmit a packet to the module 1 in the processing of the I/O command, and MP0 can return a specific response (such as a busy) to the host 100 if it is necessary to transmit a packet to the module 1.

MP1 switches a state of the SW ports #1 to #6 of SW1 from an open state to a block state. MP1 can carry out the processing as responding to a reception of a specific command from MP0 before a state of the SW ports #1 to #4 of SW0 is switched to a block state or as responding to a detection of that an access via a specific SW port such as the SW port #1 of SW0 is disabled.

MP0 switches a state of the path switches 2001A and 2001B from an ON state to an OFF state. Similarly, MP1 switches a state of the path switches 2001C and 2001D from an ON state to an OFF state.

After that, MP0 switches a state of the SW ports #1 to #4 of SW0 from a block state to an open state. Similarly, MP1 switches a state of the SW ports #1 to #6 of SW1 from a block state to an open state.

After that, SW0 obtains a module ID, a slot ID, and a PKID of SW1, and a module ID, a slot ID, and a PKID of a PK connected to SW1 from SW1 via the SW ports #1 to #4 of SW0. SW0 then updates the routing table 0 to the routing table 0 shown in FIG. 33. More specifically, a direct path flag is updated from "1" to "0" (a circle mark shown in FIG. 30 is deleted in FIG. 33) for the SW ports #1 and #2. Moreover, a connecting destination PKAD and a routing destination PKAD for the SW ports #1 and #2 become equivalent to a connecting destination PKAD and a routing destination PKAD for the SW ports #3 and #4 that have been connected to SW1 in advance. This is because, the SW ports #1 and #2 are connected to a SW connection path similarly to the SW ports #3 and #4.

Similarly, SW1 obtains a module ID, a slot ID, and a PKID of SW0, and a module ID, a slot ID, and a PKID of a PK connected to SW0 from SW0 via the SW ports #1 to #4 of SW1. In addition, SW1 obtains a module ID, a slot ID, and a PKID of CM1 and MP1 from CM1 and MP1 via the SW ports #5 and #6 of SW1. SW1 then updates the routing table 1 to the routing table 1 shown in FIG. 34 based on the module ID, the slot ID, and the PKID that have been obtained.

After that, an access to CM1 and MP1 via SW0 is restarted.

<In a Detection of an Operational Status of a Second Kind>

Figure 35:
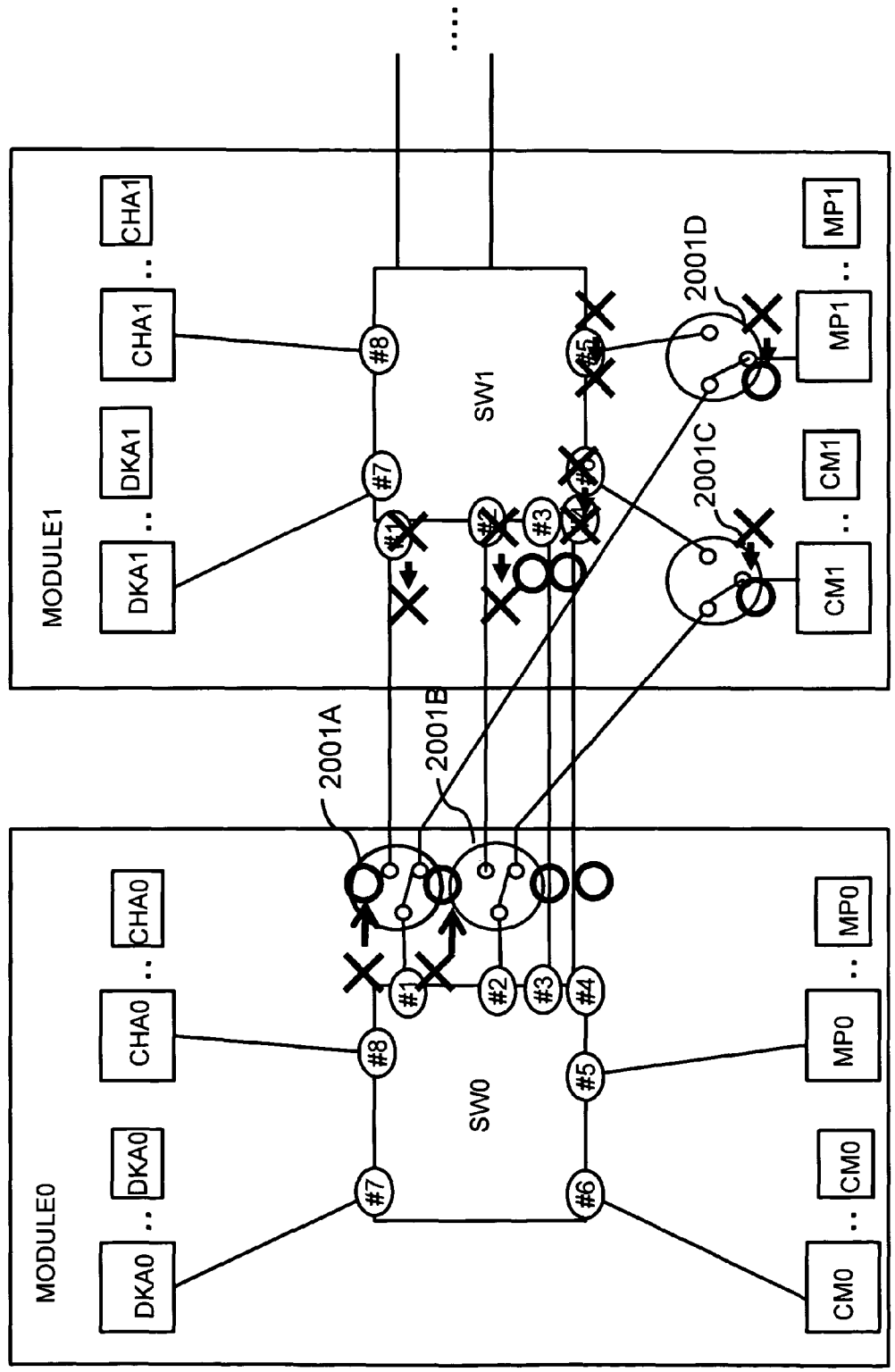
FIG. 35 is a schematic view showing a path switching in a detection of an operational status of a second kind.

In the case in which an operational status of a second kind is detected after a path switch processing for increasing a SW connection path is carried out for instance, a path switch processing is carried out for increasing a direct path as shown in FIG. 35. That is, a direct path is adopted as substitute for a SW connection path.

More specifically, in the case in which MP0 detects an operational status of a second kind for instance, MP0 refers to a routing table 0, and specifies the SW ports #3 and #4 that are connected to a SW connection path. MP0 then switches both a state of the SW ports #1 and #2 that are connected to the path switches 2001A and 2001B and a state of the specified SW ports #3 and #4 from an open state to a block state. Moreover, MP1 switches a state of the SW ports #1 to #6 of SW1 from an open state to a block state.

MP0 switches a state of the path switches 2001A and 2001B from an ON state to an OFF state. Similarly, MP1 switches a state of the path switches 2001C and 2001D from an ON state to an OFF state.

After that, MP0 switches a state of the SW ports #1 to #4 of SW0 from a block state to an open state. Similarly, MP1 switches a state of the SW ports #1 to #6 of SW1 from a block state to an open state.

After that, SW0 obtains a module ID, a slot ID, and a PKID of CM1 and MP1 from CM1 and MP1 via the SW ports #1 and #2 of SW0. In addition, SW0 obtains a module ID, a slot ID, and a PKID of SW1, and a module ID, a slot ID, and a PKID of a PK connected to SW1 from SW1 via the SW ports #3 and #4 of SW0. SW0 then updates the routing table 0 to the routing table 0 shown in FIG. 36 based on the module ID, the slot ID, and the PKID that have been obtained (here, an addition of a PK is not carried out in particular, and as a result, the contents of the routing table 0 are returned to the contents of the routing table 0 shown in FIG. 30).

Similarly, SW1 obtains a module ID, a slot ID, and a PKID of SW0, and a module ID, a slot ID, and a PKID of a PK connected to SW0 from SW0 via the SW ports #1 to #4 of SW1. In addition, SW1 obtains a module ID, a slot ID, and a PKID of CM1 and MP1 from CM1 and MP1 via the SW ports #5 and #6 of SW1. SW1 then updates the routing table 1 to the routing table 1 shown in FIG. 37 (here, an addition of a PK is not carried out in particular, and as a result, the contents of the routing table 1 are returned to the contents of the routing table 1 shown in FIG. 31).

After that, an access to CM1 and MP1 via SW0 is restarted.

The above described the second embodiment of the present invention. By the above description, both a state of the first switch set (the set of the path switches 2001A and 2001C) and a state of the second switch set (the set of the path switches 2001B and 2001D) are switched together. However, it is also possible that one of a state of the first switch set and a state of the second switch set is switched and the other is not switched.

While the preferred embodiments in accordance with the present invention have been described above, the preferred embodiments are examples for describing the present invention, and the scope of the present invention is not restricted to the embodiments. The various changes, modifications, and functional additions can be thus made without departing from the scope of the present invention. For instance, although the HDD 112 exits in every module in the preferred embodiments, it is also possible that the HDD 112 does not exit in a module and is common to a plurality of modules. In this case, an access to the HDD 112 can be carried out via DKA0 as well as via DKA1.

What is claimed is:
1. A storage system, comprising:
a plurality of storage modules including a first storage module and a second storage module,
the first storage module comprising:
a first switch circuit including a plurality of ports;
a first circuit connected to any of the plurality of ports included in the first switch circuit;
a first external I/F circuit that is a circuit for receiving an I/O (input/output) command that is a write command or a read command from an external device;
a first storage I/F circuit that is an interface circuit for communicating with a physical storage device;
a first cache memory circuit that is a circuit to which a write targeted data to be written to the physical storage device according to the write command from the external device and a read targeted data to be read from the physical storage device according to the read command from the external device and to be transmitted to the external device are written; and a first processor circuit that is a circuit for processing the I/O command received by the external I/F circuit, wherein the first external I/F circuit, the first storage I/F circuit, the first cache memory circuit, and the first processor circuit are the first circuit, the second storage module comprising:

a second circuit; and a second switch circuit provided with a plurality of ports, and comprising at least a second cache memory circuit and a second processor circuit among:

a second external I/F circuit that is a circuit for receiving an I/O command that is a write command or a read command from an external device;

a second storage I/F circuit that is an interface circuit for communicating with a physical storage device;

a second cache memory circuit that is a circuit to which a write targeted data to be written to the physical storage device and a read targeted data to be read from the physical storage device are written; and a second processor circuit that is a circuit for processing the I/O command from the external device, wherein the second external I/F circuit, the second storage I/F circuit, the second cache memory circuit, and the second processor circuit are the second circuits, the plurality of ports included in the first switch circuit further comprising:

a port (11) to which the first external I/F circuit is connected;

a port (12) to which the first storage I/F circuit is connected;

a port (13) to which the first cache memory circuit is connected;

a port (14) to which the first processor circuit is connected;

a port (15) connected to a direct path for connecting the first switch circuit and the second cache memory circuit;

a port (16) connected to a direct path for connecting the first switch circuit and the second processor circuit; and a port (17) connected to a switch connection path for connecting the first switch circuit and the second switch circuit, the plurality of ports included in the second switch circuit further comprising:

a port (21) to which the second external I/F circuit is connected;

a port (22) to which the second storage I/F circuit is connected;

a port (23) to which the second cache memory circuit is connected;

a port (24) to which the second processor circuit is connected; and a port (25) connected to a switch connection path for connecting the second switch circuit and the first switch circuit, wherein a direct path that is a path for connecting the first switch circuit and the second circuit is connected to any of the plurality of ports included in the first switch circuit, the first circuit issues a packet addressed to the second circuit, and the first switch circuit receives, from the first circuit, the packet addressed to the second circuit, and outputs the packet from a port connected to the direct path to the second circuit, and wherein the first switch circuit:

(2-1) receives a packet issued from any one of the first external I/F circuit, the first storage I/F circuit, the first cache memory circuit, and the first processor circuit via any one of the ports (11) to (14);

(2-2) judges that a transmission targeted packet is transmitted from a port connected to a direct path or a port connected to a switch connection path in the case in which the destination of the received packet is the second cache memory circuit or the second processor circuit; and (2-3) transmits the transmission targeted packet from the judged port, wherein the packet transmitted from the port (15) or (16) is sent to the second cache memory circuit or the second processor circuit through a direct path without routing the second switch circuit, and wherein the packet transmitted from the port (17) is sent to the second cache memory circuit or the second processor circuit through a switch connection path and the second switch circuit.

2. The storage system as defined in claim 1, wherein the first switch circuit receives a packet including access speed information in the (2-1), and judges that a transmission targeted packet is transmitted from the port (15) or (16) in the case in which the access speed information in the received packet indicates a high speed access, and that a transmission targeted packet is transmitted from the port (17) in the case in which the access speed information in the received packet indicates a low speed access.

3. The storage system as defined in claim 2, wherein the first external I/F circuit receives a high speed setting or a low speed setting as an access speed from the external device, and transmits a packet including access speed information that indicates the set access speed.

4. The storage system as defined in claim 2, wherein at least one of the first external I/F circuit, the first storage I/F circuit, the first switch circuit, and the first processor circuit includes access speed information that indicates a high speed access or a low speed access in a packet to be transmitted corresponding to an operational status in the storage system.

5. The storage system as defined in claim 2, wherein access speed information included in a packet to be transmitted is access speed information that indicates a high speed access in the case in which the operational status is a status in which a failure occurs in the storage system.

6. The storage system as defined in claim 2, wherein the first processor circuit receives a report packet that is a packet as a report that a write targeted data has been written to the second or first cache memory circuit from the second or first cache memory circuit, at least one of access speed information in a read packet and access speed information in an obtained packet is an information that indicates a low speed access even in the case in which access speed information in the report packet is an information that indicates a high speed access, the read packet is a packet that is transmitted by the first or second processor circuit to the first or second storage I/F circuit as a destination, and is a packet for making the first or second storage I/F circuit to obtain a write targeted data from the second or first cache memory circuit, and the obtained packet is a packet that is transmitted from the first or second storage I/F circuit to the second or first cache memory circuit as a destination as responding to the read packet, and is a packet for obtaining the write targeted data.

7. The storage system as defined in claim 1, further comprising:
- a first switch section for switching a direct path and a switch connection path as a path from the first switch circuit to the second cache memory circuit; and
- a second switch section for switching a direct path and a switch connection path as a path from the first switch circuit to the second processor circuit,
- wherein the first switch section is composed of a path switch (1A) disposed between the port (15) and the port (26) and a path switch (1B) disposed between the path switch (1A) and the second cache memory circuit,
- the second switch section is composed of a path switch (2A) disposed between the port (16) and the port (27) and a path switch (2B) disposed between the path switch (2A) and the second processor circuit,
- the port (15) is a port that is connected to a direct path in the case in which both the path switch (1A) and the path switch (1B) are in a first state, and the port (15) is a port that is connected to a switch connection path in the case in which both the path switch (1A) and the path switch (1B) are in a second state, and
- the port (16) is a port that is connected to a direct path in the case in which both the path switch (2A) and the path switch (2B) are in a first state, and the port (16) is a port that is connected to a switch connection path in the case in which both the path switch (2A) and the path switch (2B) are in a second state.

8. The storage system as defined in claim 7, wherein both the path switch (1A) and the path switch (1B) are in a first state and both the path switch (2A) and the path switch (2B) are in a first state in the case in which the second storage module is added.

9. The storage system as defined in claim 1, wherein the first switch circuit obtains a variety of ID included in each circuit via each port included in the first switch circuit, generates an address information of each circuit based on the obtained ID, and creates a routing table,
- there is a module ID that is an identifier of the storage module as a kind of ID to be obtained,
- the address information includes a module ID,
- a connecting destination address information that is an address information of a circuit of a connecting destination of each port included in the first switch circuit and a routing destination address information that is an address information of all circuits that can be accessed through each port included in the first switch circuit are registered to the routing table, and
- the first switch circuit specifies that a port corresponding to the information is a port connected to a direct path in the case in which the connecting destination address information and the routing destination address information are identical to each other and the information includes a module ID that indicates the second storage module.

10. A storage system, comprising:
- a plurality of storage modules including a first storage module and a second storage module,
- the first storage module comprising:
- a first switch circuit including a plurality of ports; and
- a first circuit connected to any of the plurality of ports included in the first switch circuit;
- the second storage module comprising:
- a second circuit; and
- a second switch circuit provided with a plurality of ports,
- the plurality of ports included in the first switch circuit further comprising:
- a port (11) that is connected to the first circuit;
- a port (12) that is connected to a direct path for the second circuit; and
- a port (13) connected to a switch connection path for connecting the first switch circuit and the second switch circuit,
- the plurality of ports included in the second switch circuit further comprising:
- a port (21) that is connected to the second circuit; and
- a port (22) that is connected to the switch connection path,
- wherein a direct path that is a path for connecting the first switch circuit and the second circuit is connected to any of the plurality of ports included in the first switch circuit,
- the first circuit issues a packet addressed to the second circuit, and
- the first switch circuit receives, from the first circuit, the packet addressed to the second circuit, and outputs the packet from a port connected to the direct path to the second circuit, and
- wherein the first switch circuit:
- (11-1) receives a packet in which the destination is the second circuit from the first circuit;
- (11-2) judges that a transmission targeted packet is transmitted from a port connected to a direct path or a port connected to a switch connection path; and
- (11-3) transmits the transmission targeted packet from the judged port,
- the packet transmitted from the port (12) is sent to the second circuit through a direct path without routing the second switch circuit, and
- the packet transmitted from the port (13) is sent to the second circuit through a switch connection path and the second switch circuit.

11. The storage system as defined in claim 10, wherein the first switch circuit receives a packet including access speed information in the (11-1), and judges that a transmission targeted packet is transmitted from the port (12) in the case in which the access speed information in the received packet indicates a high speed access, and that a transmission targeted packet is transmitted from the port (13) in the case in which the access speed information in the received packet indicates a low speed access.

12. The storage system as defined in claim 11, wherein the first circuit includes access speed information that indicates a high speed access or a low speed access in a packet to be transmitted corresponding to an operational status in the storage system.

13. The storage system as defined in claim 12, wherein access speed information included in a packet to be transmitted is access speed information that indicates a high speed access in the case in which the operational status is a status in which a failure occurs in the storage system.

14. The storage system as defined in claim 10, further comprising a switch section for switching a direct path and a switch connection path as a path from the first switch circuit to the second circuit,
- the plurality of ports included in the second switch circuit further comprising a port (23), wherein the switch section is composed of a path switch (1A) disposed between the port (11) and the port (23) and a path switch (1B) disposed between the path switch (1A) and the second circuit, and
- the port (11) is a port that is connected to a direct path in the case in which both the path switch (1A) and the path switch (1B) are in a first state, and the port (11) is a port that is connected to a switch connection path in the case in which both the path switch (1A) and the path switch (1B) are in a second state.

15. The storage system as defined in claim 10, wherein both the path switch (1A) and the path switch (1B) are in a first state and both the path switch (2A) and the path switch (2B) are in a first state in the case in which the second storage module is added.

16. The storage system as defined in claim 10, wherein the first switch circuit obtains a variety of ID included in each circuit via each port included in the first switch circuit, generates an address information of each circuit based on the obtained ID, and creates a routing table,
   there is a module ID that is an identifier of the storage module as a kind of ID to be obtained,
   the address information includes a module ID,
   a connecting destination address information that is an address information of a circuit of a connecting destination of each port included in the first switch circuit and a routing destination address information that is an address information of all circuits that can be accessed through each port included in the first switch circuit are registered to the routing table, and
   the first switch circuit specifies that a port corresponding to the information is a port connected to a direct path in the case in which the connecting destination address information and the routing destination address information are identical to each other and the information includes a module ID that indicates the second storage module.

17. The storage system as defined in claim 11, further comprising a switch section for switching a direct path and a switch connection path as a path from the first switch circuit to the second circuit,
   the plurality of ports included in the second switch circuit further comprising a port (23),wherein the switch section is composed of a path switch (1A) disposed between the port (11) and the port (23) and a path switch (1B) disposed between the path switch (1A) and the second circuit, and
   the port (11) is a port that is connected to a direct path in the case in which both the path switch (1A) and the path switch (1B) are in a first state, and the port (11) is a port that is connected to a switch connection path in the case in which both the path switch (1A) and the path switch (1B) are in a second state.

18. The storage system as defined in claim 12, further comprising a switch section for switching a direct path and a switch connection path as a path from the first switch circuit to the second circuit,
   the plurality of ports included in the second switch circuit further comprising a port (23),wherein the switch section is composed of a path switch (1A) disposed between the port (11) and the port (23) and a path switch (1B) disposed between the path switch (1A) and the second circuit, and
   the port (11) is a port that is connected to a direct path in the case in which both the path switch (1A) and the path switch (1B) are in a first state, and the port (11) is a port that is connected to a switch connection path in the case in which both the path switch (1A) and the path switch (1B) are in a second state.

19. The storage system as defined in claim 13, further comprising a switch section for switching a direct path and a switch connection path as a path from the first switch circuit to the second circuit,
   the plurality of ports included in the second switch circuit further comprising a port (23),wherein the switch section is composed of a path switch (1A) disposed between the port (11) and the port (23) and a path switch (1B) disposed between the path switch (1A) and the second circuit, and
   the port (11) is a port that is connected to a direct path in the case in which both the path switch (1A) and the path switch (1B) are in a first state, and the port (11) is a port that is connected to a switch connection path in the case in which both the path switch (1A) and the path switch (1B) are in a second state.

* * * * *